United States Patent
Kurita et al.

[11] Patent Number: 5,220,788
[45] Date of Patent: Jun. 22, 1993

[54] APPARATUS FOR DETECTING PURIFICATION FACTOR OF CATALYST IN CATALYTIC CONVERTER OF INTERNAL COMBUSTION ENGINE

[75] Inventors: Noriaki Kurita, Nagoya; Katsuhiko Nakabayashi, Handa, both of Japan

[73] Assignee: Nippondenso Co., Ltd., Kariya, Japan

[21] Appl. No.: 749,526

[22] Filed: Aug. 26, 1991

[30] Foreign Application Priority Data

Aug. 24, 1990 [JP] Japan .................................. 2-223465
Jul. 31, 1991 [JP] Japan .................................. 3-215935

[51] Int. Cl.$^5$ ............................................. F01N 3/20
[52] U.S. Cl. ...................................... 60/274; 60/276; 60/277
[58] Field of Search .......................... 60/276, 277, 274

[56] References Cited

U.S. PATENT DOCUMENTS

| | | | |
|---|---|---|---|
| 3,962,866 | 6/1976 | Neidhard et al. | 60/276 |
| 3,969,932 | 7/1976 | Rieger et al. | 60/277 |
| 4,622,809 | 11/1986 | Abthoff | 60/276 |
| 4,739,614 | 4/1988 | Katsuno et al. | 60/274 |
| 5,018,348 | 5/1991 | Durschmidt | 60/277 |
| 5,077,970 | 1/1992 | Hamburg | 60/276 |

FOREIGN PATENT DOCUMENTS 63-97852  4/1988 Japan .
63-231252 9/1988 Japan .

Primary Examiner—Douglas Hart
Attorney, Agent, or Firm—Cushman, Darby & Cushman

[57] ABSTRACT

Deterioration of a catalyst of a catalytic converter of an internal combustion engine is detected, during negative feedback control of the air-fuel ratio based on an output signal from at least one of a pair of $O_2$ sensors disposed respectively upstream and downstream from the catalyst in the exhaust system. Detection is executed after changing the feedback period, which is the period of alternation of a feedback correction coefficient used to control the fuel injection quantity, with the change in period being such as to provide improved accuracy of detection of catalyst deterioration. The change may consist of a single step change, in which the feedback period is set to a specific predetermined value at which the output signal amplitude from the downstream sensor, or the phase difference between the two sensor output signals, should be within predetermined limits if the catalyst is in satisfactory condition.

26 Claims, 27 Drawing Sheets

FIG. 4(a)

|  | FRONT 1.5Hz | FRONT 0.7Hz |
|---|---|---|
| CCRO 80% | $r < 1$ | $r \fallingdotseq 1$ |
| CCRO 50% | $r \fallingdotseq 1$ | $r \fallingdotseq 1$ |

FIG. 4(b)

|  |  | FRONT 1.5Hz | FRONT 0.7Hz |
|---|---|---|---|
| PURIFICATION FACTOR | 80% | $A < 1$ | $A \fallingdotseq 1$ |
|  | 50% | $A \fallingdotseq 1$ | $A \fallingdotseq 1$ |

APPARATUS FOR DETECTING PURIFICATION FACTOR OF CATALYST IN CATALYTIC CONVERTER OF INTERNAL COMBUSTION ENGINE

BACKGROUND OF THE INVENTION

1. Field of the Invention

The present invention relates to an apparatus for detecting the purification factor of a catalyst of a catalytic converter used in an internal combustion engine. The quantity "purification factor", as used herein is a measure of the effectiveness of the catalyst in removing pollutants from the exhaust gas of the engine.

2. Description of the Related Art

Various types of apparatus for detecting the purification factor of a catalyst have been proposed in the prior art (where the term "detecting" as used herein can signify an operation for judging whether the purification factor is above a predetermined reference value, or an operation for actually measuring the purification factor). For example, an apparatus has been proposed which has a pair of $O_2$ sensors disposed in the exhaust system of an internal combustion engine, respectively upstream and downstream from the catalytic converter, with the purification factor of the catalyst in that catalytic converter being detected based on a response delay of these $O_2$ sensors. Such a system is described for example in Japanese Patent Laid-open No. 51-55818.

An apparatus is also known in the prior art (for example as described in Japanese Patent Laid-open No. 49-109721) in which a decision is made as to whether or not deterioration of the catalyst has occurred, based on an output value produced from an $O_2$ sensor that is disposed downstream from the catalytic converter, or based on a relationship between output values that are produced from two $O_2$ sensors that are disposed respectively upstream and downstream from the catalytic converter.

In controlling the air-fuel ratio of an internal combustion engine, in order to bring the actual air-fuel ratio close to a stoichiometric value of air-fuel ratio, a method is now widely utilized whereby the duration of the fuel injection time intervals is changed by negative feedback control in accordance with output values produced from an $O_2$ sensor which is disposed in the exhaust system. Specifically, a value for the injection interval duration, which determines a fuel injection quantity, is computed based on the rate of air intake and the engine speed, and that fuel injection quantity is corrected by an air/fuel ratio feedback correction coefficient which is derived based on an output signal produced from the $O_2$ sensor. Thus, negative feedback control of the fuel injection time interval duration is achieved. In the following, the term air-fuel ratio feedback correction coefficient will be abbreviated to F/B correction coefficient.

Basically, when the $O_2$ sensor output indicates a lean condition of the air-fuel ratio, the feedback correction coefficient is changed in a direction tending to increase the fuel injection interval duration, whereas when the $O_2$ sensor output indicates a rich condition of the air-fuel ratio, the F/B correction coefficient is changed in a direction tending to decrease the fuel injection interval duration. As a result of that feedback control, as viewed from the micro aspect, the actual air-fuel ratio varies periodically about a central value which is the stoichiometric air-fuel ratio, while as viewed from the macro aspect, the actual air-fuel ratio is brought close to the stoichiometric air-fuel ratio. The frequency of that variation, i.e. the frequency of variation of the F/B correction coefficient (which is basically identical to the frequency of variation of the output signal from the $O_2$ sensor) will be referred to as the feedback frequency, and the corresponding period as the feedback period.

As shown in FIG. 2, in the case of a normal value of frequency (for example, 1.5 Hz) of the output signal from the $O_2$ sensor that is disposed upstream from the catalytic converter in the exhaust system, and is designated as the "front" $O_2$ sensor, the waveform of the output from the $O_2$ sensor that is located downstream from the catalytic converter, designated as the "rear" $O_2$ sensor, successively changes as shown in diagrams (a), (b), (c) and (d) of FIG. 2, in accordance with lowering of the purification factor, as the catalyst deteriorates. That is to say, when the catalyst is new (e.g. the purification factor is 98%) then as shown in diagram (a), the output signal from the rear $O_2$ sensor varies slowly in amplitude between a high level which corresponds to a rich value of air-fuel ratio and will be referred to in the following simply as the "rich condition" of that signal, and a low level which corresponds to a lean value of air-fuel ratio and will be referred to in the following simply as the "lean condition" of that signal. The signal exhibits large-amplitude changes whose timings are unrelated to the frequency of the output signal from the front $O_2$ sensor, i.e. are unrelated to the feedback frequency. When the catalyst has slightly deteriorated (e.g. the purification factor is 96%) then as shown in diagram (b), the amplitude of the output signal from the rear $O_2$ sensor becomes small, however the changes between the rich and lean conditions of the output signal from the rear $O_2$ sensor are still unrelated to the frequency of the output signal from the front $O_2$ sensor. As deterioration of the catalyst proceeds (e.g. when the purification factor falls to 80%) then as shown in diagram (c), the output signal from the rear $O_2$ sensor still varies overall with a long period of variation, but with the high-frequency waveform of the output signal from the front $O_2$ sensor superimposed upon that variation. When the deterioration of the catalyst reaches a stage such that the purification factor falls to 50% then as shown in diagram (d) the outputs from the rear $O_2$ sensor and front $O_2$ sensor are substantially identical in waveform.

Judgment of deterioration of the catalyst based on the output signal waveforms from the upstream and downstream $O_2$ sensors will now be considered. As shown in FIG. 3, if the frequency of changeover between the rich and lean conditions of the output signal from the front $O_2$ sensor is relatively long, e.g. 0.7 Hz, then the waveforms of the outputs from the front and rear $O_2$ sensors will become almost identical, even if substantial catalyst deterioration has occurred. In the prior art, detection of catalyst deterioration has been based on the ratio of the frequencies of the outputs from the front $O_2$ sensor and rear $O_2$ sensor, or the ratio of the amplitudes of these outputs. However in many cases, throughout the operating life of the catalyst, the frequency of the output signal from the front $O_2$ sensor gradually decreases from an initially relatively high value (e.g. 1.5 Hz). If that frequency becomes substantially low (e.g. reaches approximately 0.7 Hz), then it can be understood from FIG. 3 that it will become impossible to discriminate between purification factor values of, for example, 80% and 50%, since the waveforms of the output signals from the front and rear O2 sensors will be substantially identical, irrespective of the degree of catalyst deterioration. That is clear from the contents of the tables in FIG. 4, which show examples of specific values for the frequency ratio r and the amplitude ratio A of the output signals from the front and rear sensors, at feedback frequency values of 0.5 Hz and 1.5 Hz, for the case of 80% and 50% purification factor values.

Thus, it has not been possible to achieve a sufficiently high accuracy of judging the state of deterioration of the catalyst of a catalytic converter of an internal combustion engine, in the prior art.

SUMMARY OF THE INVENTION

It is an objective of the present invention to provide an improved apparatus and method for executing detection of catalyst deterioration, in an internal combustion engine system having a catalytic converter and a pair of O2 sensors which are disposed in the exhaust system of the engine respectively upstream and downstream from the catalytic converter.

To achieve that objective, an apparatus and method according to the present invention is based upon changing the feedback period during a catalyst deterioration detection operation to a value which is different from the feedback period that occurs during normal air-fuel ratio control operation. One method of changing the feedback period, according to the present invention, is to set that period to a predetermined value such as to ensure optimum accuracy of detecting the purification factor, i.e. accuracy of determining whether the purification factor is above a certain reference level or accuracy of measuring the value of the purification factor. The purification factor can be judged by detecting whether the amplitude of the output signal from the downstream O2 sensor reaches a predetermined threshold voltage (i.e. which should not be reached, for the case of that predetermined value of feedback period, if the catalyst is still in a satisfactory condition). Alternatively, the purification factor can be judged on the basis of a measured value of phase difference between the output signals from the upstream and downstream O2 sensors.

A second method of altering the feedback period during a catalyst deterioration detection operation, according to the present invention, is to change the feedback period by successive small amounts, and to detect when the amplitude of the output signal from the downstream O2 sensor reaches a predetermined threshold voltage. The value of feedback period at which that threshold voltage is reached is then measured, and the purification factor of the catalyst can then be obtained based on a known relationship between values of purification factor and values of feedback period at which the threshold voltage is reached.

More specifically, according to a first aspect the present invention provides, in an internal combustion engine having a catalytic converter containing a catalyst disposed in an exhaust system of the engine, and first and second oxygen sensors respectively disposed upstream and downstream from said catalyst within said exhaust system, said first and second oxygen sensors producing respective output signals, each signal selectively indicating rich and lean air-fuel ratio conditions, a catalyst purification factor detection apparatus comprising:

feedback correction means responsive to at least said output signal from said first oxygen sensor for obtaining successive values of a feedback correction coefficient which is applied to control a fuel injection quantity of said internal combustion engine, said successive values changing periodically, with a feedback period, between a condition for producing an increase in said fuel injection quantity and a condition for producing a reduction of said fuel injection quantity;

feedback correction coefficient control means functioning during an operation for judging a purification factor of said catalyst, for changing said feedback period to a different value from a feedback period which occurs during a normal air-fuel ratio control condition; and detection means for judging said purification factor, based at least on said output signal from said second oxygen sensor.

According to a second aspect, the apparatus further comprises means for deriving from said output signal from said first oxygen sensor a corresponding first air-fuel ratio signal which goes to first and second fixed levels in accordance with a rich and a lean air-fuel ratio respectively, means for deriving from said first air-fuel ratio signal a second air-fuel ratio signal wherein each transition between said first and second levels is delayed by a specific amount with respect to a corresponding transition of said first air-fuel ratio signal, with a period of alternation of said second air-fuel ratio signal defining said feedback period.

According to a third aspect, the apparatus further comprises means for changing said amount of delay by a delay operational quantity, for thereby implementing said changing of said feedback period to a different value during an operation of purification factor judgement.

According to a fourth aspect, said feedback period is changed to a predetermined target value, and said feedback correction coefficient control means comprises means for deriving a requisite value for said delay operational quantity, including means for measuring a current value of said feedback period, means for calculating a frequency difference between said current value and said target value of feedback period, and means for deriving said value of additional amount of delay based on said frequency difference and a predetermined relationship between values of said feedback period and amounts of delay applied to said first air-fuel ratio signal for obtaining said second air-fuel ratio signal.

According to a fifth aspect, the said target value of feedback period is selected to be longer than a value of feedback period which occurs during a normal emission control operating condition of said engine, and to be within a range of values of feedback period which do not result in a lowering of emission control quality.

According to a sixth aspect, said target value is determined based on a current rate of flow of intake air to said engine.

According to a seventh aspect, said feedback correction coefficient control means functions to increase said feedback period to a predetermined target value during said operation for purification factor judgement, and said detection means functions to detect whether an amplitude variation of said output signal from said second oxygen sensor reaches a predetermined threshold value.

According to an eighth aspect, said feedback correction coefficient control means functions to increase said feedback period by successive specific small amounts during said operation for purification factor judgement, and said detection means functions to detect a value of feedback period at which a variation amplitude of said output signal from said second oxygen sensor reaches a predetermined threshold value, and to compare said feedback period value with a predetermined reference feedback period value.

According to a ninth aspect, said feedback correction coefficient control means functions to increase said feedback period to a predetermined target value of feedback period during said operation for purification factor judgement, and said detection means functions to measure a value of phase difference between said output signals from the first and second oxygen sensors, and to obtain a value of purification factor of said catalyst from said phase difference value, based upon a predetermined relationship between respective values of said phase difference and purification factor at said target value of feedback period.

According to a tenth aspect, said phase difference value is measured by said detection means as a time difference between a transition between conditions of said output signal from the first oxygen sensor indicating a rich air-fuel ratio and a lean air-fuel ratio respectively, and a corresponding transition of said output signal from the second oxygen sensor.

According to an eleventh aspect, said phase difference value is measured as an average value of time interval $(T_{RL}+T_{LR})/2$, where $T_{RL}$ is a time difference between a point at which said feedback correction coefficient changes from a condition for producing an increased value of said fuel injection quantity to a condition for producing a decreased value of said fuel injection quantity to a point at which said output signal from the second oxygen sensor changes from a condition indicating a rich air-fuel ratio to a condition indicating a lean air-fuel ratio, and $T_{LR}$ is a time difference between a point at which said feedback correction coefficient changes from a condition for producing a decreased value of said fuel injection quantity to a condition for producing an increased value of said fuel injection quantity and a point at which said output signal from the second oxygen sensor changes from a condition indicating a lean air-fuel ratio to a condition indicating a rich air-fuel ratio.

According to a twelfth aspect, the invention provides a catalyst purification factor detection apparatus for an internal combustion engine, comprising:

a catalytic converter containing a catalyst, disposed in an exhaust system of said internal combustion engine, and first and second oxygen sensors respectively disposed upstream and downstream from said catalyst within said exhaust system, said first and second oxygen sensors producing respective output signals, each signal selectively indicating rich and lean air-fuel ratio conditions;

feedback correction means responsive to at least said output signal from said first oxygen sensor for obtaining successive values of a feedback correction coefficient which is applied to control a fuel injection quantity of said internal combustion engine, transitions of said values occurring periodically, with a feedback period, between a condition for producing an increase in said fuel injection quantity and a condition for producing a reduction of said fuel injection quantity, said correction means including means for delaying said transitions by a specific amount with respect to corresponding transitions of said output signal from the first oxygen sensor between said rich and lean indication conditions;

feedback correction coefficient control means functioning during an operation for judging a purification factor of said catalyst, for changing said feedback period from a value of feedback period which occurs during a normal emission control condition to a target feedback period, by changing said delay amount by a delay operational quantity; and detection means for judging said purification factor, based at least on said output signal from said second oxygen sensor.

According to a thirteenth aspect, said correction means includes means for measuring a current value of said feedback period, means for computing an amount of difference between said target feedback period and said current feedback period, and means for obtaining an appropriate value for said delay operational quantity based on said difference and upon a known relationship between values of delay applied to said transitions of the output signal from the first oxygen sensor and corresponding values of feedback period.

According to a fourteenth aspect, said feedback correction means includes means for executing each of said periodic changes of feedback correction coefficient as a stepwise change in accordance with a predetermined skip quantity.

According to a fifteenth aspect, the invention provides a catalyst purification factor for an internal combustion engine, comprising:

a catalytic converter containing a catalyst, disposed in an exhaust system of said internal combustion engine, and first and second oxygen sensors respectively disposed upstream and downstream from said catalyst within said exhaust system, said first and second oxygen sensors producing respective output signals, each signal selectively indicating rich and lean air-fuel ratio conditions;

feedback correction means responsive to at least said output signal from said first oxygen sensor for obtaining successive values of a feedback correction coefficient which is applied to control a fuel injection quantity of said internal combustion engine, transitions of said values occurring periodically, with a feedback period, between a condition for producing an increase in said fuel injection quantity and a condition for producing a reduction of said fuel injection quantity, said correction means including means for delaying said transitions by a specific amount with respect to corresponding transitions of said output signal from the first oxygen sensor between said rich and lean indication conditions;

feedback correction coefficient control means functioning during an operation for judging a purification factor of said catalyst, for increasing said feedback period from a value of feedback period which occurs during a normal emission control condition to a target feedback period, by changing said delay amount by a predetermined delay operational quantity that is determined based on a difference between said target feedback period and a current value of feedback period; and detection means for measuring a value of phase difference between said output signals from the first and second oxygen sensors, for obtaining a value of purification factor of said catalyst from said phase difference value, based upon a predetermined relationship between respective values of said phase difference and purification factor at said target value of feedback period, and for comparing said obtained value of purification factor with a reference value of purification factor.

According to a sixteenth aspect the invention provides, in an internal combustion engine having a catalytic converter containing a catalyst disposed in an exhaust system of the engine, a first oxygen sensor and a second oxygen sensor disposed in said exhaust system respectively upstream and downstream from said catalyst, and means for executing negative feedback control of an air-fuel ratio of said engine based upon at least an output signal produced from said first oxygen sensor by deriving successive values of a feedback correction coefficient which is applied to control a fuel injection quantity of said engine, said values varying periodically with a feedback period between a condition for increasing said fuel injection quantity and a condition for decreasing said fuel injection quantity, a method of detecting a purification factor of said catalyst, comprising steps of:

changing said feedback period to a value that is different from a feedback period which occurs during a normal air-fuel ratio control mode of operation; and detecting said purification factor, on the basis of a condition of at least an output signal produced from said second oxygen sensor.

BRIEF DESCRIPTION OF THE DRAWING

FIGS. 4a and 4b show a table of values of ratio between output signal amplitude values from an upstream and a downstream $O_2$ sensor, at different values of feedback period and different values of purification factor, and a table of values of ratio between output signal frequency values from an upstream and a downstream $O_2$ sensor, at different values of feedback period and different values of purification factor;

DESCRIPTION OF PREFERRED EMBODIMENTS

Before describing specific embodiments of the present invention, some general principles of the invention will be briefly described. The present invention is applicable to an internal combustion engine having a catalytic converter, and a pair of $O_2$ sensors which are disposed in the exhaust system respectively upstream and downstream from the catalytic converter. With the present invention, during an operation to detect the purification factor of the catalyst in the catalytic converter, i.e. to detect the degree of deterioration of the catalyst, the feedback frequency (which can be considered identical to the frequency of the output signal from the upstream $O_2$ sensor) is forcibly changed by a substantial amount. With the present invention, that frequency can be set to a specific predetermined value, during the catalyst purification factor detection operation. As will be described in detail in the following with reference to the embodiments, such a change in the feedback frequency enables a the purification factor to be reliably and accurately detected, which has not been possible with prior art methods of detection in which the feedback frequency is left unchanged from the frequency that exists during normal air-fuel ratio control.

Figure 19:
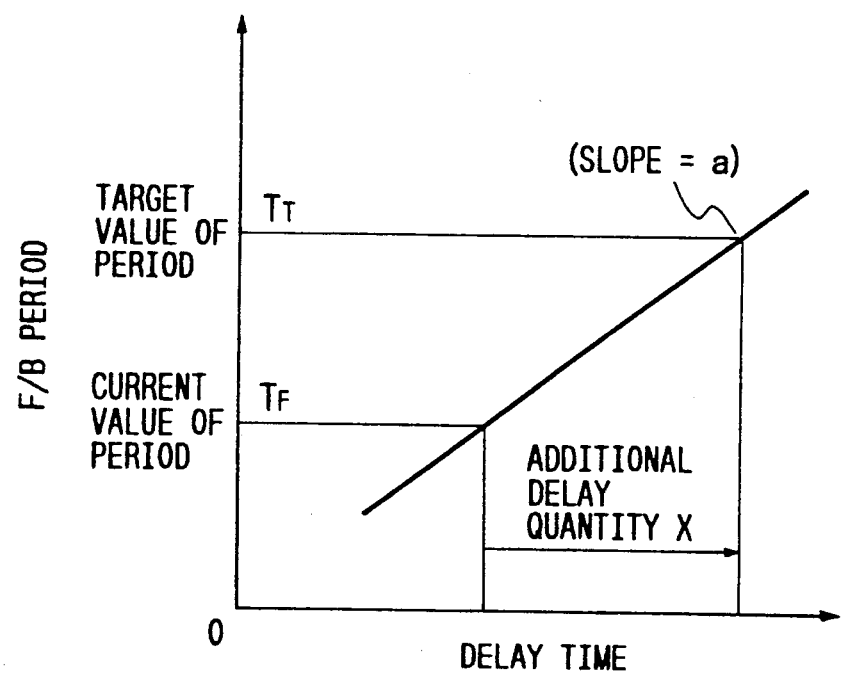
FIG. 19 shows a characteristic relationship between values of delay time which are applied to the F/B correction coefficient and corresponding values of feedback period.

With the embodiments of the present invention described hereinafter, transitions of the F/B correction coefficient between a condition for producing an increase in the fuel injection interval and a condition for producing a reduction of the fuel injection interval are obtained by delaying the transitions between the lean and rich conditions and the transitions between the rich and lean conditions of the output signal from the upstream $O_2$ sensor by respective delay amounts, which are calculated on the basis of the output signal from the downstream $O_2$ sensor. One method of changing the feedback frequency (i.e. to set that frequency to a predetermined value during a catalyst purification factor detection operation as described above) is to change each of these delay amounts by an identical amount, referred to in the following as a delay operational quantity. We have found, that there is a predictable, substantially linear relationship between changes in that delay amount and resultant changes in the feedback frequency, as shown in FIG. 19.

Hence, with a first method of catalyst purification factor detection according to the present invention, the feedback frequency is set to a specific predetermined value (which can differ substantially from the feedback frequency during normal air-fuel ratio control) during a catalyst purification factor detection operation, by first measuring the current value of feedback frequency (during normal air-fuel ratio control operation), to thereby determine the amount of frequency change that is necessary, and then obtaining the required amount of change in delay that will produce the desired amount of frequency change. When that change in delay is then executed, with air-fuel ratio feedback control in operation, the requisite change in the feedback frequency will be obtained. The purification factor of the catalyst can then be judged by determining whether the amplitude of the output signal from the downstream $O_2$ sensor exceeds a predetermined level (since there is a known relationship between the amplitude of the output signal from the downstream $O_2$ sensor and the purification factor of the catalyst, at a specific predetermined feedback frequency).

A second method of detecting the catalyst purification factor is to change the feedback frequency by executing successive small increases in the aforementioned delay operational quantity. With one embodiment of the present invention described hereinafter, such successive small increases, which produce corresponding successive small changes in the feedback period are executed during a catalyst purification factor detection operation until the output signal level from the downstream $O_2$ sensor exceeds a predetermined level. Since there is a known relationship between values of purification factor and values of feedback period at which that threshold level is exceeded, the catalyst purification factor can thereby be measured. That is to say, the degree of catalyst deterioration is judged on the basis of the amplitude of the output signal from the downstream $O_2$ sensor. The feedback period (and hence the period of the output signal from the upstream $O_2$ sensor) is successively changed until the amplitude of the output signal from the downstream $O_2$ sensor reaches a predetermined threshold value, (for example, 0.7 V), which corresponds to a reference value of purification factor that is used to for catalyst deterioration judgement.

Figure 27:
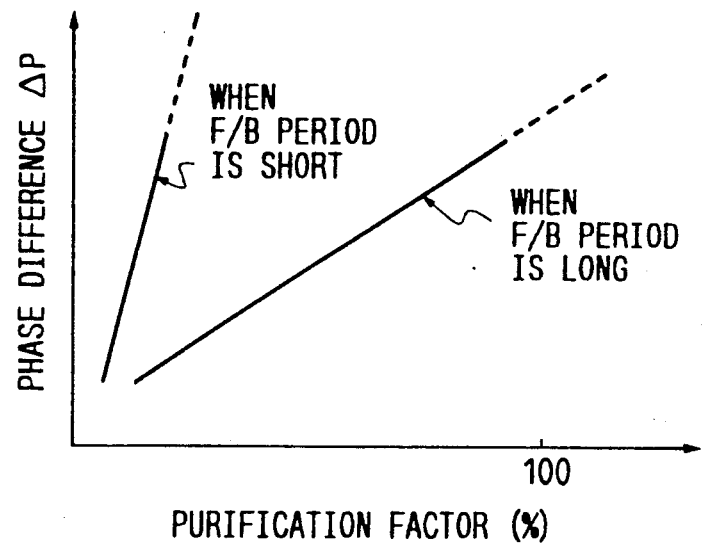
FIG. 27 shows characteristic relationships between values of output signal amplitude from the downstream $O_2$ sensor and values of catalyst purification factor, for two different values of feedback period.

A third method of catalyst purification factor detection according to the present invention is to obtain the phase difference between the output signals from the upstream $O_2$ sensor and the downstream $O_2$ sensor, at a specific predetermined feedback frequency. That is to say, judgement of the purification factor is based on a response delay difference between the output signals from the upstream $O_2$ sensor and downstream $O_2$ sensor, expressed as a phase difference T between these output signals. FIG. 27 shows the relationship between the catalyst purification factor and the amplitude of output signal voltage from the downstream $O_2$ sensor, for two different values of feedback period. The period indicated as "short" corresponds approximately to the feedback period during normal air-fuel ratio control operation. The broken-line portions indicate regions in which judgement cannot be achieved based on the phase difference, i.e. regions in which there is an excessive deviation between the periods of the outputs from the upstream $O_2$ sensor and downstream $O_2$ sensor, so that the phase difference between these cannot be used for detection purposes. As will be clear from this diagram, if it is to be judged whether or not the purification factor is approximately 80% for example, then it will be necessary to increase the feedback period during the catalyst deterioration judgement operation, e.g. from the "short" value to the "long" value. This can be achieved as described above referring to FIG. 19, by using the linear relationship between feedback period and delay time.

Figure 5:
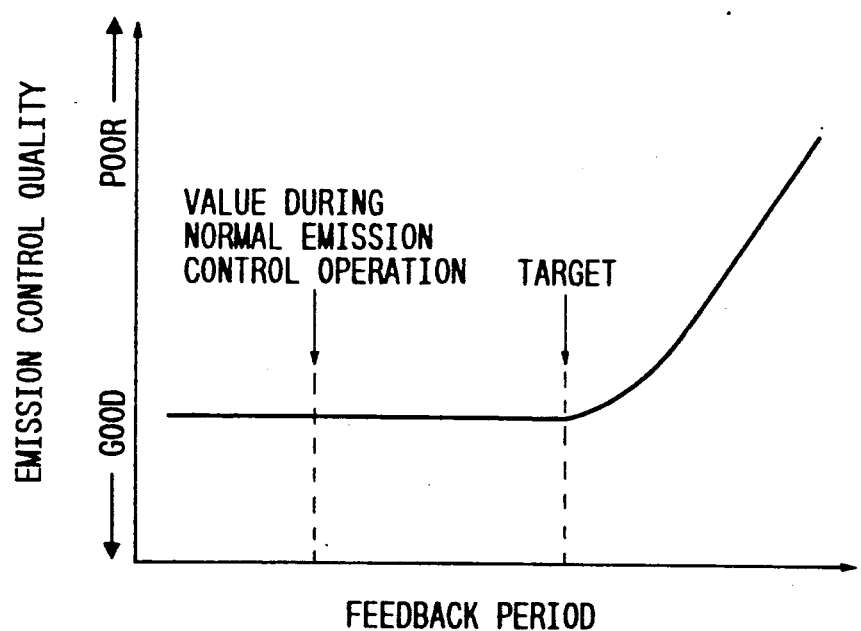
FIG. 5 is a characteristic which relates emission control quality and feedback period.

As shown in FIG. 5, in the case of an internal combustion engine equipped with a catalytic converter, there is a specific relationship between the feedback period and the emission control quality of that converter (i.e. the degree to which exhaust gas pollutants are eliminated), whereby the emission control quality becomes lowered if the feedback period is increased beyond a certain range.

Thus in order to optimize the emission control quality it is necessary for the feedback period to be limited to within that range 23. It is therefore possible to increase the feedback period during a catalyst purification factor detection operation only up to a certain limit, e.g. to the period value indicated as "target" in FIG. 5.

With the present invention, the feedback period can be changed from the period which occurs during normal air-fuel ratio control operation to such a specific target value.

It can thus be understood that one basic feature of the present invention is that during a catalyst purification factor detection operation, the feedback period can be set to a specific predetermined value which is different from the feedback period which occurs during normal air-fuel ratio control operation. A known relationship between the amplitude of the output signal from the downstream $O_2$ sensor and the purification factor, or between the phase difference between the output signals from the upstream $O_2$ sensor and the downstream $O_2$ sensor, can then be used to accurately detect the purification factor, i.e. determine whether the degree of deterioration of the catalyst is within acceptable limits. Moreover, the target value of feedback period that is established during such a catalyst purification factor detection operation can be selected such as to optimize the accuracy of the detection.

Figure 1:
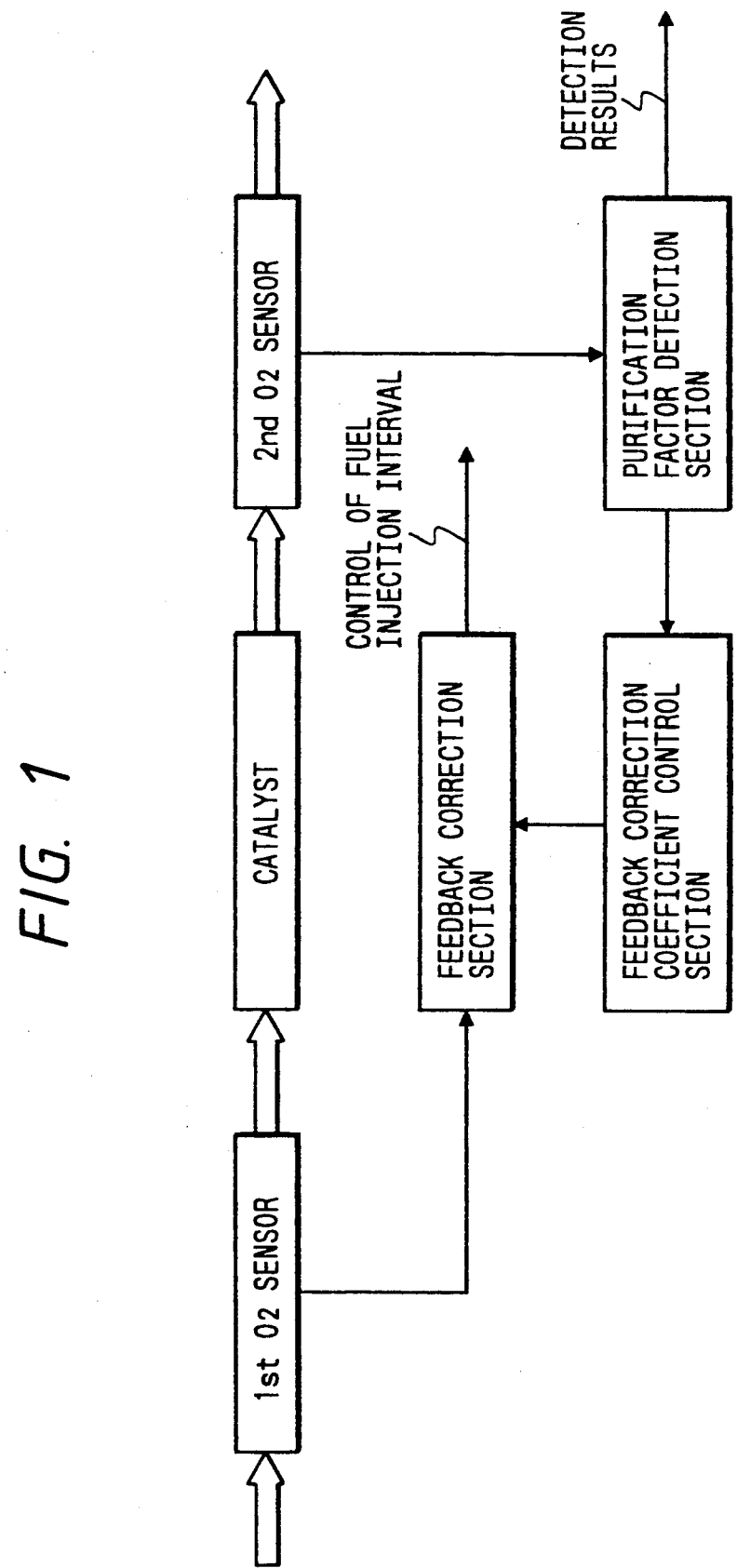
FIG. 1 is a conceptual block diagram of the overall configuration of a catalyst purification factor deterioration detection apparatus according to the present invention.
Figure 2:
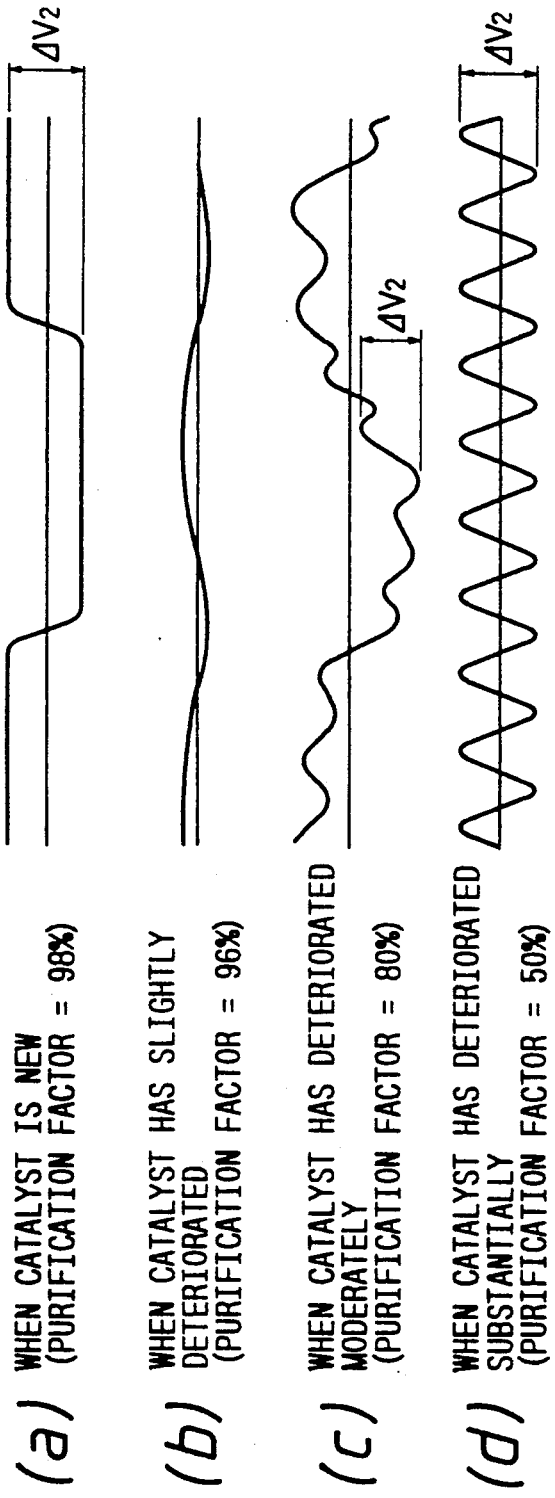
FIGS. 2a–2d show a relationship between the output signal amplitude from a downstream $O_2$ sensor and different values of catalyst purification factor.
Figure 3:
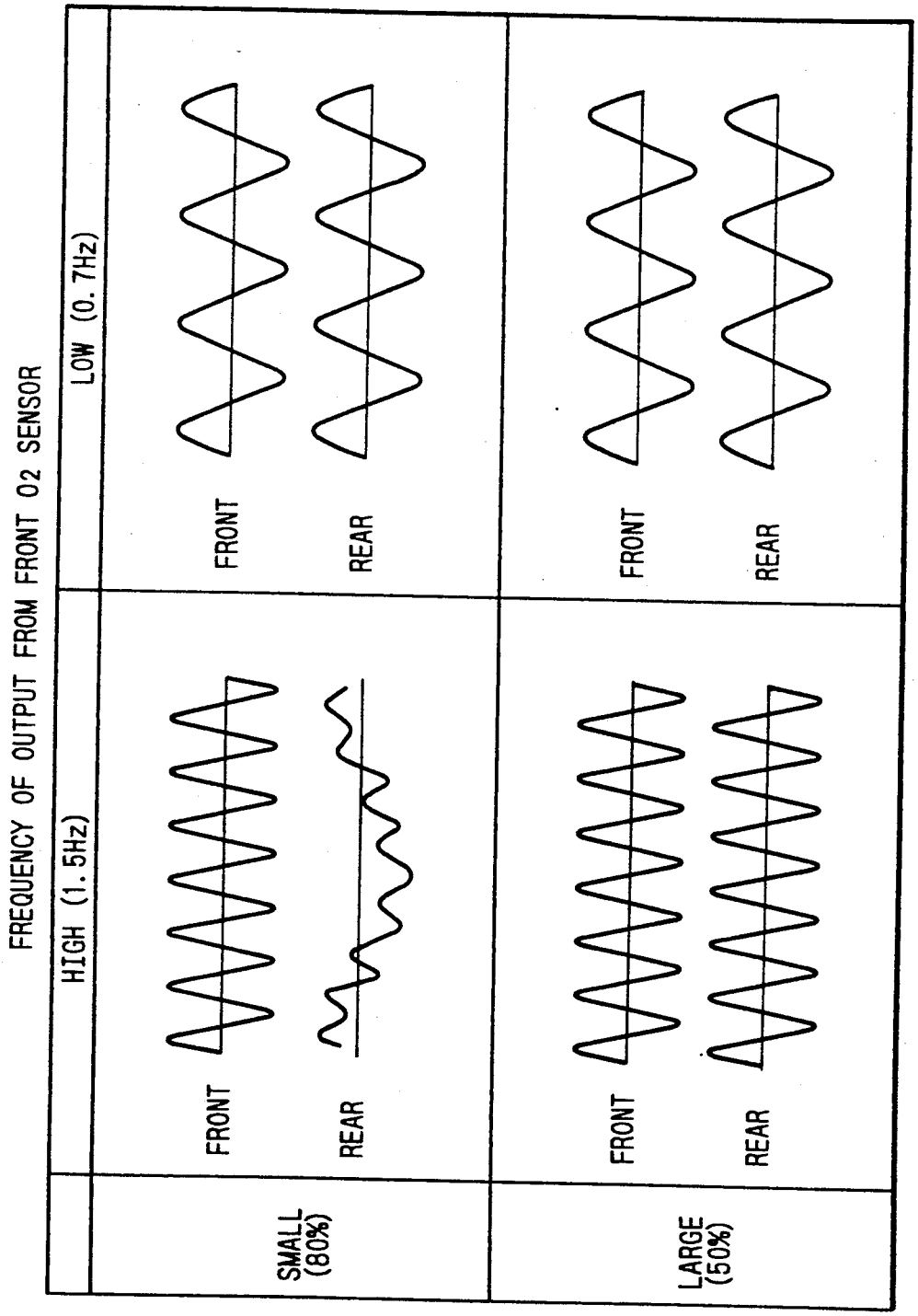
FIG. 3 shows relationships between output signal waveforms from an upstream $O_2$ sensor and a downstream $O_2$ sensor, at different values of feedback period and different values of purification factor.

FIG. 1 is a conceptual block diagram for summarizing the basic features of an apparatus according to the present invention. This consists of first and second $O_2$ sensors 3000 and 3002, which are positioned respectively upstream and downstream from a catalyst 3001 of a catalytic converter, within the exhaust system of an internal combustion engine. A feedback correction section 3003 is responsive to an output signal from the upstream O₂ sensor 3000 for controlling the duration of fuel injection intervals of the engine in accordance with successive values of a F/B correction coefficient which are produced therefrom, with these F/B correction coefficient values varying periodically between a condition causing increased fuel injection interval durations (i.e. for producing a more rich air-fuel ratio) and a condition causing decreased fuel injection interval durations (i.e. for producing a more lean air-fuel ratio). The period of these variations of the F/B correction coefficient values is referred to as the feedback frequency. During a periodically executed operation for detecting deterioration of the catalyst 3001, the feedback frequency, i.e. the feedback period, is changed by a predetermined amount under the control of a purification factor detection section 3005, which also judged a degree of deterioration of the catalyst 3001, in accordance with a condition of the output signal that is produced from the second O₂ sensor 3002 during that condition of changed feedback period.

It will be understood that each of the sections 3003 to 3005 can be implemented, in a practical apparatus, by operations executed by a microcomputer in accordance with specific programs.

Figure 6:
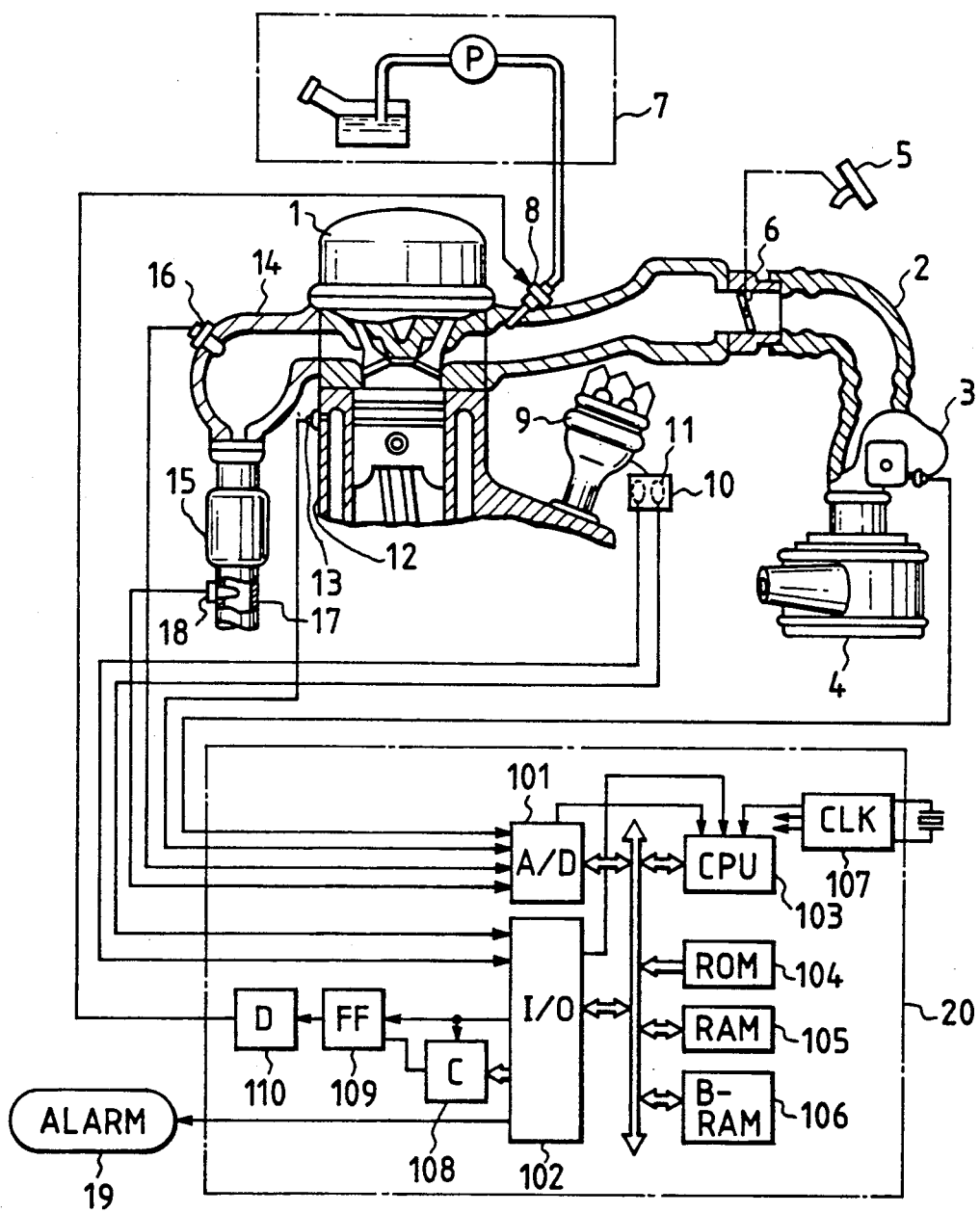
FIG. 6 shows the overall configuration of an embodiment of a catalyst purification factor detection apparatus, equipped in an internal combustion engine.

A first embodiment of the present invention will be described in the following. FIG. 6 is a diagram showing the overall configuration the first embodiment, applied to an internal combustion engine which powers a motor vehicle. In FIG. 6, an air flow meter 3 is disposed in an air intake passage 2 of the engine body 1, for measuring the rate of intake air flow of the engine, and generates an analog output signal which is directly proportional to that rate of flow. That output signal is supplied to an analog-to-digital (A/D) converter 101 within a control circuit 20, that control circuit being is based on a microcomputer which operates in accordance with a program which includes a plurality of periodically executed routines, as described hereinafter. A distributor 9 has a shaft that is provided with a crank angle sensor 10, which generates a reference position detection pulse signal at times which respectively correspond to points at which the crank angle of the internal combustion engine reaches 720°, and a crank angle sensor 11 which generates a reference position detection pulse signal at times which respectively correspond to 30° positions of the crank angle. These pulse signals produced from the crank angle sensors 10 and 11 are supplied to an input-/output interface 102 of the control circuit 20, with the output signal from the crank angle sensor 10 being supplied to an interrupt input terminal of a CPU 103 of the control circuit 20.

In addition, fuel injection valves 8 are also provided in the air intake passage 2, for supplying fuel under pressure, from the fuel supply system, to the intake ports of respective ones of the cylinders of the internal combustion engine. A water temperature sensor 13 is provided within the water jacket 12 of the cylinder block of the engine body 1, for detecting the cooling water temperature. The cooling water temperature sensor 13 generates an analog voltage signal in accordance with the temperature THW of the cooling water, which is supplied to the A/D converter 101.

A catalytic converter 15 containing three types of catalyst, for removing HC, CO and NOx pollutants simultaneously from the exhaust gas, is disposed in the exhaust system downstream from the exhaust manifold 14.

A first O₂ sensor (hereinafter referred to as the upstream O₂ sensor) 16 is disposed upstream from the catalytic converter 15 in the exhaust manifold 14, while a second O₂ sensor (hereinafter referred to as the downstream O₂ sensor) 18 is disposed in the exhaust pipe 17, downstream from the catalytic converter 15. The O₂ sensors 16 and 18 generate respective output voltage signals in accordance with the concentrations of oxides in the exhaust gas. That is to say, the O₂ sensors 16 and 18 supply respectively different levels of output voltage to the A/D converter 101 of the control circuit 20, in accordance with whether the air-fuel ratio is relatively lean or relatively rich, in relation to the stoichiometric air/ratio.

In addition to the A/D converter 101 the control circuit 20 includes the I/O interface 102, a CPU 103, a ROM 104, RAM 105, a back-up RAM 106, and a clock signal generating circuit 107, etc. The control circuit 20 also includes a down-counter 108, a flip-flop 109, and drive circuit 110, for controlling the fuel injection valves 8. During execution of a program routine described hereinafter, when a fuel injection quantity TAU is calculated, that quantity is preset into the down-counter 108, while at the same time the flip-flop 109 is set. As a reset, the drive circuit 110 initiates activation of one of the fuel injection valves 8. The counter 108 counts successive pulses of a clock signal (not shown in the drawing) and when a final count value is reached, a carry output terminal of the down counter goes to the "1" logic level, whereupon the FF 109 is reset and the activation of a valve 8 by the drive circuit 110 is terminated. Thus each of the fuel injection valves 8 is only activated during a time interval that corresponds to the aforementioned fuel injection quantity TAU, so that an amount of fuel that is determined in accordance with that fuel injection quantity TAU is injected into a combustion chamber of the engine.

An interrupt command is generated and supplied to the CPU 103 when a conversion operation by the A/D converter 101 has been completed, when a pulse signal from the crank angle sensor 11 has been received by the I/O interface 102, when an interrupt signal generated by the clock signal generating circuit 107 is received, etc.

In each occurrence of a periodically executed analog/digital conversion routine, intake air rate data Q, from the air flow meter 3, and cooling water temperature data THW, are received by the control circuit 20 and are stored in a predetermined memory area of the RAM 105. The data Q and data THW held in the RAM 105 are thereby updated at periodic intervals. In addition, an interrupt is generated each time a 30° crank angle position is detected by the crank angle sensor 11, whereupon rotational velocity data Ne are calculated and are stored in a predetermined region of the RAM 105.

Numeral 19 denotes an alarm, which is controlled by the CPU 103, and is activated to provide a warning indication to the drive of the vehicle when the catalytic converter 15 is judged to have deteriorated beyond a predetermined limit, i.e. when the purification factor of the catalyst has fallen below a fixed reference value.

The operation of feedback control of air-fuel ratio will be described in the following. Firstly, the process of calculating the feedback correction coefficient will be described.

Figure 7:
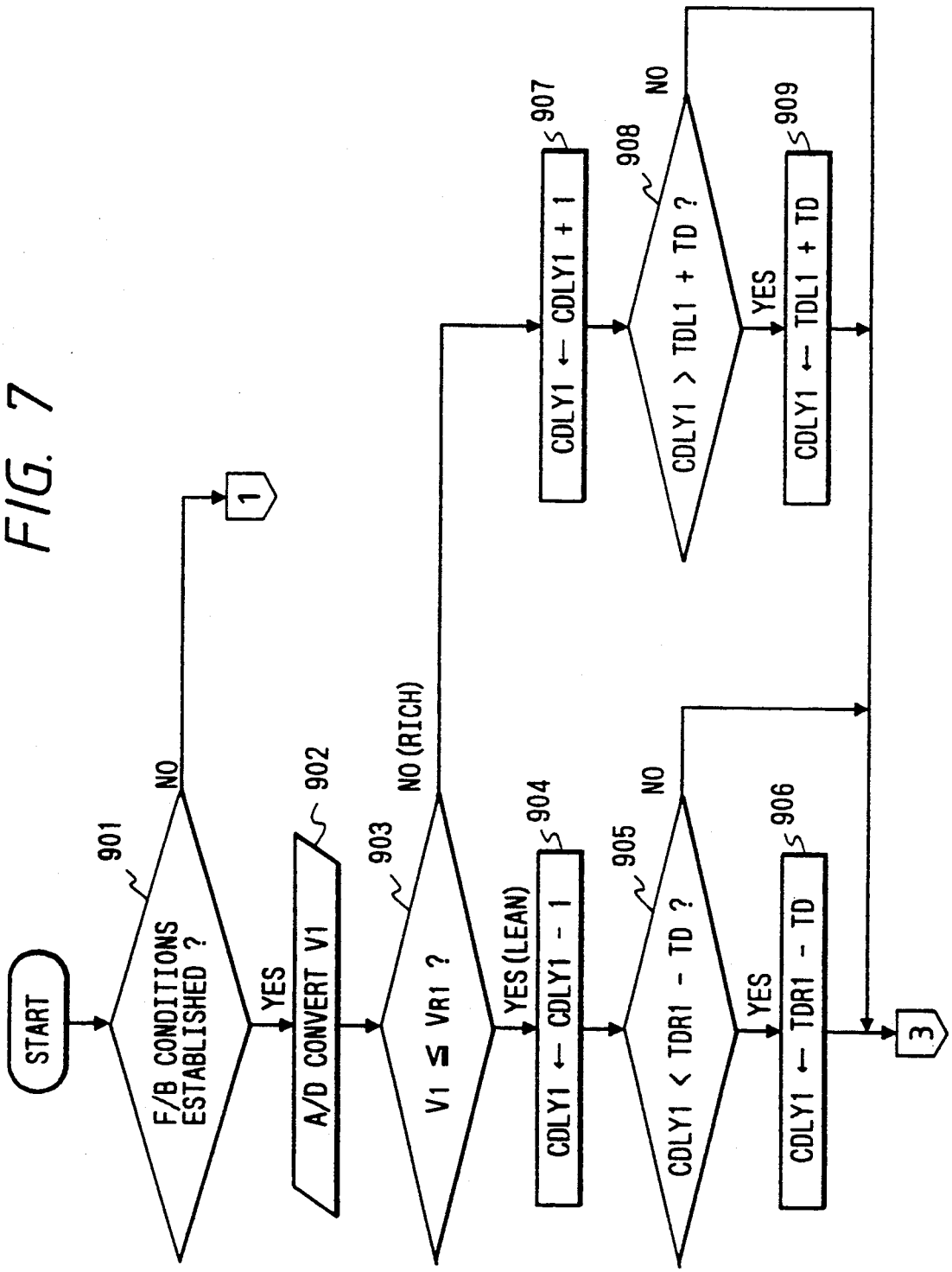
FIGS. 7, 8 constitute a flow chart of a program routine which is executed by a computer in the embodiment of FIG. 6, for computing successive values of a F/B correction coefficient.
Figure 8:
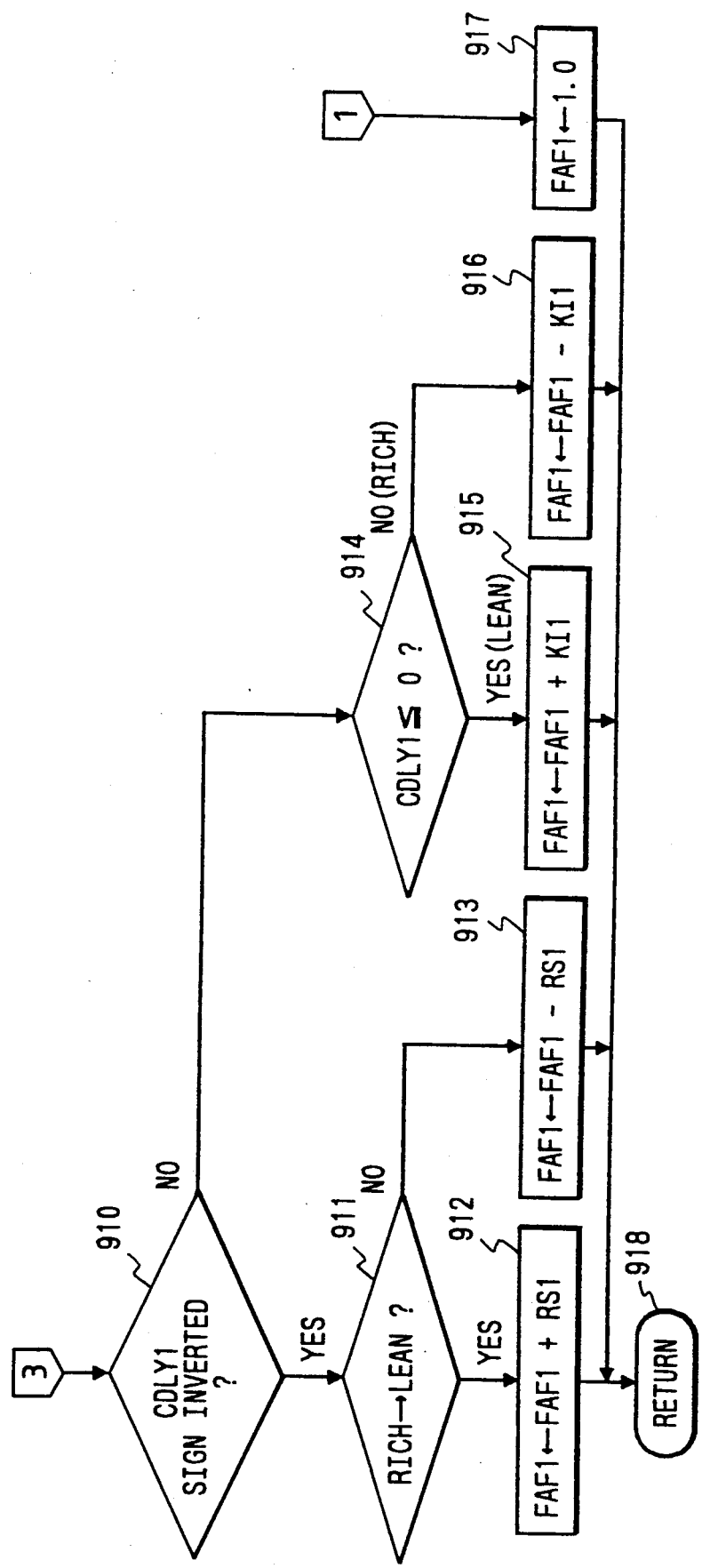
Figure 9:
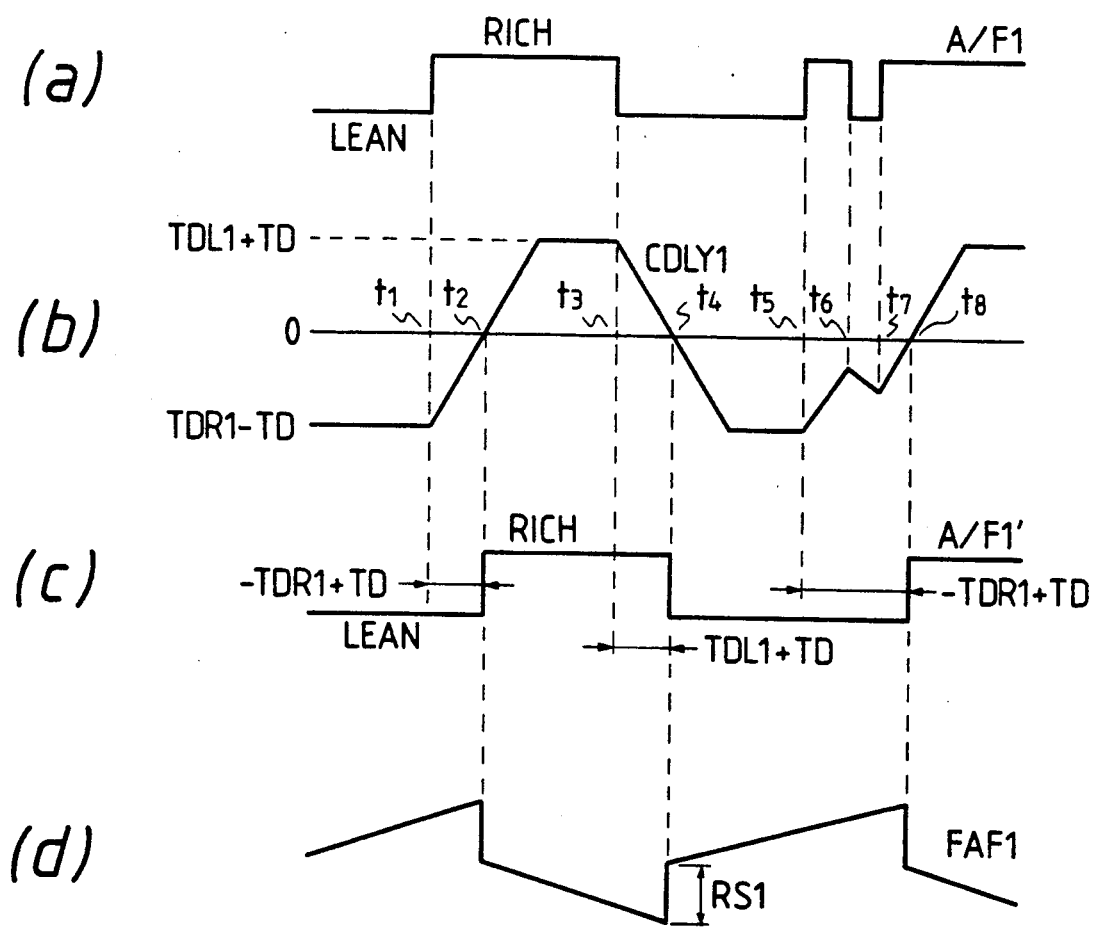
FIGS. 9a–9d are timing diagrams for describing the operation of the routine of FIGS. 7, 8.

FIGS. 7, 8 are a flow chart of an air-fuel ratio feedback control routine which, executed by the microcomputer of the control circuit 20, to compute successive values for the air/fuel ratio F/B correction coefficient FAF1, based on the output signal from the upstream $O_2$ sensor 16. That routine is executed at periodic 4 ms intervals. FIG. 9 is a timing diagram for illustrating the operations executed in the flow chart.

In step 901 a decision in made as to whether or not the closed-loop (feedback) air-fuel ratio conditions using the upstream $O_2$ sensor 16 are established. At certain times the closed-loop conditions are not established, e.g. during engine start-up, during a fuel supply increase operation which follows the engine start-up, during engine warm-up, during an increase in the engine power, during "lean control", i.e. an operating condition in which the engine is made to operate with an air-fuel ratio that is more lean than the stoichiometric ratio, or when the upstream $O_2$ sensor 16 is in the inactivated state, etc. At any other times, the closed-loop conditions are satisfied. The judgment as to whether the upstream $O_2$ sensor 16 is in the activated or non-activated state can be made by reading out the cooling water temperature data THW from the RAM 105, and judging whether or not THW is greater than or equal to 70° C., or by judging whether or not the output signal from the upstream $O_2$ sensor 16 has gone from a high to a low level at least once. If the closed-loop conditions are not satisfied, then operation advances to step 917 in which the feedback correction coefficient FAF1 is made equal to 1.0. If the closed-loop conditions are found to be established, then operation advances to step 902.

In step 902, the input signal $V_1$ from the upstream $O_2$ sensor 16 is subjected to analog/digital conversion, and in step 903 a decision is made as to whether or not $V_1$ is lower than a comparison threshold voltage $V_{R1}$, which can be for example 0.45 V. That is to say, a judgment is made as to whether the air-fuel ratio is rich or lean. An air-fuel ratio signal A/F1 is thereby generated, which will be assumed to go a high level when the air-fuel ratio is rich, and to a low level when the air-fuel ratio is lean, as illustrated in diagram (a) of FIG. 9.

If the air-fuel ratio is found to be lean (i.e. $V_1 \leq V_{R1}$) then in step 904 the delay counter CDLY1 is decremented by one, and then in steps 905, 906, operations are executed to limit the minimum value of CDLY1 to TDR1−TD, where. That minimum value TDR1−TD will be referred to as a rich delay time, which serves to ensure that a decision that the engine is operating with a lean air-fuel ratio (as indicated by the output from the upstream $O_2$ sensor 16) will be maintained for a certain time, after the air-fuel ratio changes from the lean to the rich condition. TDR1−TD is defined as a negative value.

If the air-fuel ratio is judged to the rich (i.e. $V_1 > V_{R1}$), then operation advances to step 904 in which the delay counter CDLY1 is incremented by 1, then in steps 908, 909 operations are executed to limit the count value of CDLY1 to TDL1+TD. The maximum value TDL1+TD will be referred to as a lean delay time, which is used to ensure that a judgement that the air-fuel ratio is lean will be maintained for a certain time, after the output signal from the upstream $O_2$ sensor 16 has changed from a condition indicating the rich condition to the lean condition. TDL1+TD is defined as a positive value.

TDR1 and TDL1 are respective delay amounts, updated values for which are calculated periodically as described hereinafter. The operations described above can be understood more clearly from the timing diagram of FIG. 9, in which diagram (a) shows a first air-fuel ratio signal designated as A/F1 which is derived (e.g. by amplitude limiting) from the output signal of the upstream $O_2$ sensor 16, which goes to a first fixed (high) level to indicate a lean value of air-fuel ratio and to a second fixed (low) level to indicate a rich value of air-fuel ratio, and in which transitions between the rich and lean conditions are identical in timing to corresponding transitions of the output signal from the upstream $O_2$ sensor 16. The variations of the count value of the counter CDLY1 are shown in diagram (b) of FIG. 9. Diagram (c) of FIG. 9 shows a second air-fuel ratio signal A/F1′ which goes to the high (rich indication) level when the counter CDL1 changes from a negative to a positive count value, and goes to the low (lean indication) level when counter CDL1 changes from a positive to a negative count value. It can be understood that the air-fuel ratio signal A/F1′ is substantially identical in period to the first air-fuel ratio signal A/F1, but is delayed with respect to that signal by an amount which is determined by the values of TDR1 and TDL1, and which is increased in accordance with the value of TD.

TD is a quantity (which in the embodiments described herein is a positive value), which is added to both of the delay quantities TDL1 and −TDR1 during an operation for judging the catalyst purification factor, as shown in diagram (c) of FIG. 9, for thereby changing the feedback period by a specific amount. TD will be referred to in the following as the delay operational quantity.

In step 910 of FIG. 8, a decision is made as to whether or not the sign of the first delay counter CDLY1 has been inverted. That is to say, a decision is made as to whether or not the air-fuel ratio has changed from rich to lean, or from lean to rich, after the delay processing. If the air-fuel ratio has been changed over, then in step 911 a decision is made as to whether or not the change has been from rich to lean, or from lean to rich. If the change has found to be from the rich to the lean condition, then in step 912 a stepwise increment is executed to change the value of the feedback correction coefficient, designated as FAF1, by a skip amount +RS1, i.e. FAF1←FAF1+RS1. Thus there is a step change in the F/B correction coefficient value, towards a condition whereby the fuel injection interval will be increased. Conversely if the change has found to be from the lean to the rich condition, then in step 913 a stepwise decrement is executed to change the value of the F/B correction coefficient FAF1 by −RS1, i.e. FAF1←FAF1−RS1. Thus there is a step change in the F/B correction coefficient value, towards a condition whereby the fuel injection interval will be decreased.

In step 910, if is found that the sign of the first delay counter CDLY1 has not been inverted, then integration processing is executed in steps 914, 915 and 916. Specifically, in step 914 a decision is made as to whether or not CDLY1≦0. If CDLY1≦0 (i.e. the air-fuel ratio is lean) then step 915 is executed, in which the F/B correction coefficient FAF1 is incremented by KI1, where KI1 is an integration constant which is substantially smaller than the skip amount RS1. That is, FAF1←FAF1+KI1. If on the other hand CDLY1>0 (i.e. the air/fuel ratio is rich) then step 917 is executed, in which FAF1 is decremented by KI1, i.e. FAF1−FAF1←KI1. Thus if the air-fuel ratio is found to be lean, then it will be moved toward the rich condition by successive executions of step 915, (i.e. when CDY1≦0), which causes the F/B correction coefficient FAF1 to be gradually increased, and hence causes the fuel injection quantity to be gradually increased. Conversely if the air-fuel ratio is found to be rich, then it will be moved towards the lean condition by successive executions of step 916, (i.e. when CDLY1>0), which causes the fuel injection quantity to be gradually decreased.

The value of F/B correction coefficient FAF1 which is established in one of the steps 912, 913, 915, 916 or 917 is held within a minimum value of, for example, 0.8, and a maximum value of for example 1.2. As a result, if for some reason the value of the F/B correction coefficient FAF1 becomes excessively large or excessively small, there is no danger that the air-fuel ratio of the engine will be controlled on the basis of that excessively large or small value, so that the air-fuel ratio is prevented from becoming excessively rich or lean.

Each new value for the F/B correction coefficient FAF1 that is calculated as described above is stored in the RAM 105, and execution of the routine is terminated at step 918.

It can be understood from the above that, as shown in diagram (a) of FIG. 9 when it is judged that the air-fuel ratio signal A/F1 indicates a rich condition, based on the output signal from the upstream O₂ sensor 16, then the delay counter CDLY1 is incremented as shown in FIG. 9(B). Conversely, if the signal A/F1 indicates a lean condition then the counter CDLY1 is decremented. As a result, as shown in diagram (c) of FIG. 9, the delayed air-fuel ratio signal A/F1′ is obtained.

For example at the time point t1, the air/fuel ratio signal A/F1 changes from the lean to the rich indication state, so that the delay processed air/fuel ratio signal A/F1′ is held at the lean indication condition during an interval in which the air-fuel ratio is actually in the rich state, i.e. the interval −TDR1+TD. The signal A/F1′ then changes to indicate the rich condition, at time point t2. Similarly, although the air-fuel ratio signal A/F1 changes from the rich to the lean indication condition at the time point t3, the delayed air-fuel ratio signal A/F1′ continues to indicate a rich condition, during a specific interval, i.e. the lean delay interval TDL1+TD, and the signal A/F1′ only changes to indicate the lean condition at the time point t4.

IF the air-fuel ratio signal A/F1 becomes inverted within an interval that is shorter than the rich delay interval (−TDR1+TD), i.e. as occurs at each of the time points t5, t6 and t7 indicated in diagram (b), then it is necessary for a sufficient amount of time to elapse for the first delay counter CDLY1 to reach the reference count value of 0. Thus, the delay processed air-fuel ratio signal A/F1′ does not go to the rich indication state until the time point t8. It can thus be understood that the period of the delayed air-fuel ratio signal A/F1′ is made more stable than that of the air/fuel ratio signal A/F1. The air-fuel ratio feedback correction coefficient FAF1 is then obtained, as shown in diagram (d) of FIG. 9 based on that air-fuel ratio signal A/F1′.

A routine for correction of the F/B correction coefficient will be described in the following.

In addition to the first type of air-fuel ratio control, based upon the output signal from the upstream O₂ sensor 16 as described above, it is necessary to periodically correct the F/B correction coefficient that is obtained in that routine, with that correction being based on the output signal from the downstream O₂ sensor 18, to thereby implement a second type of air-fuel ratio control. Such a second type of air-fuel ratio control could consist of deriving a second air-fuel ratio F/B correction coefficient FAF2, deriving respective values for the delay intervals −TDR1 and TDL1 as the first air-fuel ratio feedback control constants, deriving a value for the skin quantity RS1 (with in this case would actually consist of a rich skip quantity RS1R which is used in the case of a change from a lean to a rich air-fuel ratio, and a lean skip quantity RS1L which is used in the case of a change from a rich to a lean air-fuel ratio, with RS1R and RS1L being set mutually separately), deriving a value for the integration constant KI1 (which would actually consist of a rich integration constant KI1R which is used in the case of a change from a lean to a rich air-fuel ratio, and a lean integration constant KI1L which is used in the case of a change from a rich to a lean air-fuel ratio, with KI1R and KI1L being set mutually separately), or deriving a value for the comparison voltage $V_{R1}$ of the output $V_1$ from the upstream O₂ sensor 16.

If for example the rich delay interval (−TDR1+TD) is set to a value that is greater than the lean delay interval (TDL1+TD), then the controlled air-fuel ratio will move towards the rich condition. Conversely, if the lean delay interval (TDL1+TD) is set to a value that is greater than the rich delay interval (−TDR1+TD), then the controlled air-fuel ratio will move towards the lean condition. In that way, the air/fuel ratio is controlled by correcting the values of the delay time intervals −TDR1+TD, TDL1+TD in accordance with the output from the downstream O₂ sensor 18. (The value of the delay operational quantity TD is zero during normal air-field ratio control operation, and is set to a specific value during a catalyst purification factor detection operation, as described hereinafter).

Figure 10:
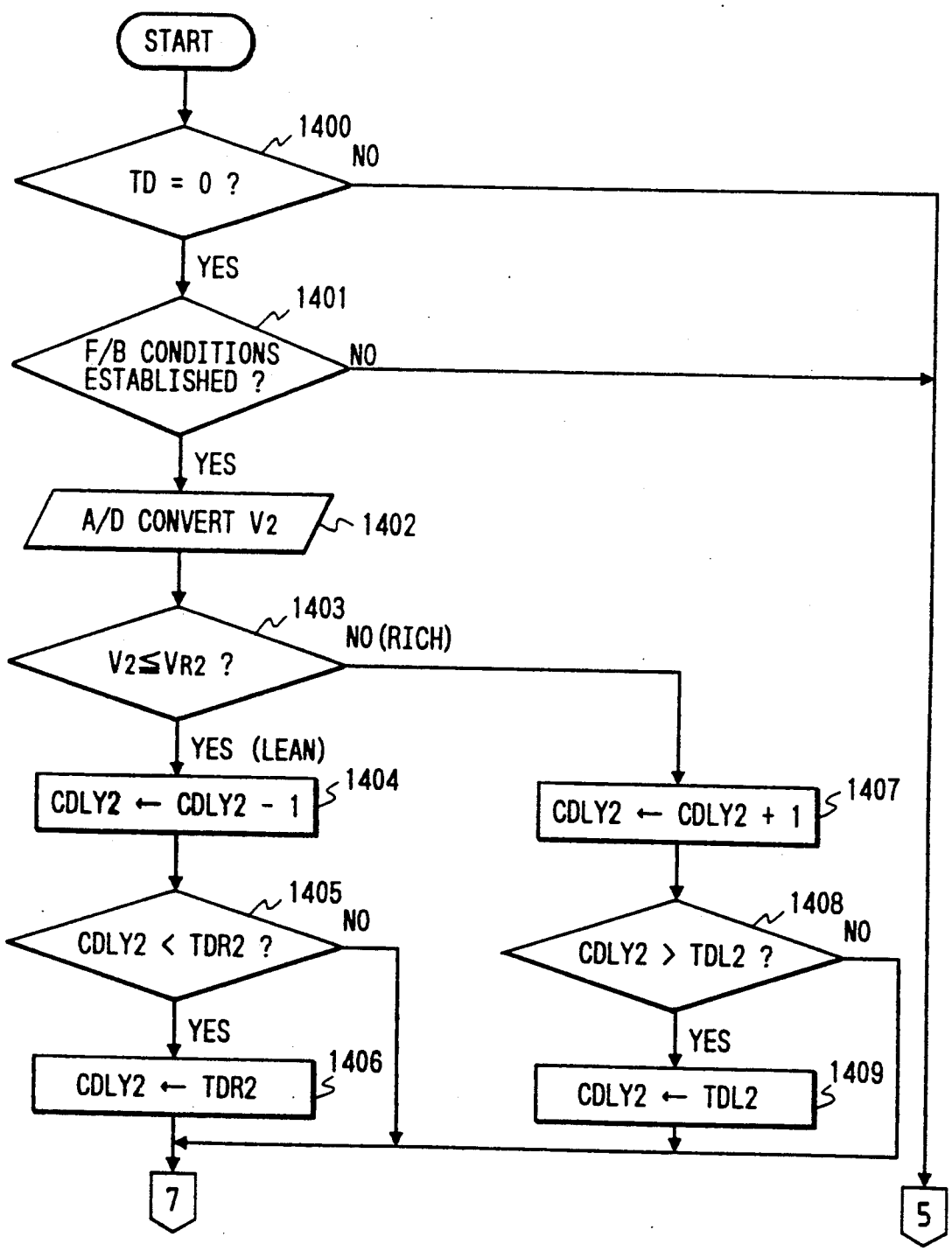
FIGS. 10, 11 constitute a flow chart of a routine which is executed for computing values of time delay which are applied in the routine of FIGS. 7, 8 to the values of F/B correction coefficient.
Figure 11:
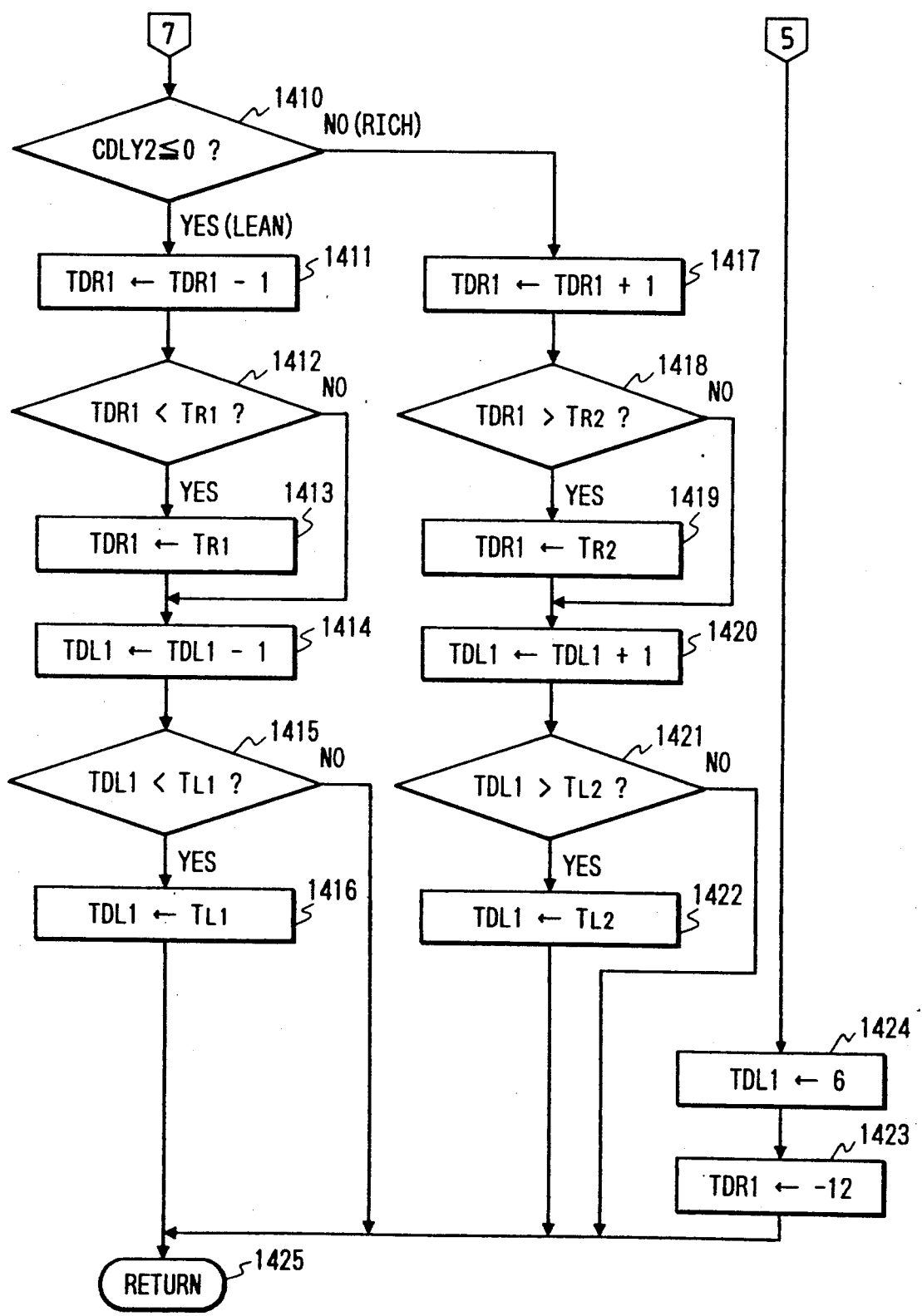

FIGS. 10, 11 show an example of a second air-fuel ratio feedback control routine for executing such correction of the F/B correction coefficient that is obtained by the first routine of FIGS. 7, 8 described above. The routine of FIGS. 10, 11 periodically calculates new values for the delay time intervals TDR1 and TDL1, based on the output signal from the downstream O₂ sensor 18. This routine is executed at intervals of one second. In step 1400 a decision is made as to whether or not judgement is in progress of deterioration of the catalyst, based on whether or not the delay operational quantity TD is equal to 0 (since TD is set to a non-zero value only during a judgement operation). In step 1401, as for step 901 of FIGS. 7, 8, a decision is made as to whether or not the air-fuel ratio closed-loop conditions are established.

If detection of deterioration of the catalyst is currently in progress, or if the closed-loop conditions are not satisfied, then operation advances to step 1423 and 1424 in which fixedly predetermined values are set for the rich delay interval TDR1 and the lean delay interval TDL1. These can be set for example as:

TDR1←—12 (equivalent to 48 ms)

TDL1←6 (equivalent to 24 ms)

The reason for setting the rich delay interval TDR1 to a greater value than the the lean delay interval TDL1 is that the comparison voltage $V_{R1}$ is set to a low value, for example 0.45 V, i.e. is set towards the lean side.

If detection of deterioration of the catalyst is not currently being executed, and the closed-loop conditions are established, then operation advances to step 1402.

In steps 1402 to 1409, operations corresponding to those of the steps 902 to 909 in FIGS. 7, 8 are executed. Specifically, a step 1403 is executed for judging whether the air-fuel ratio is rich or lean, and delay processing is executed in steps 1404 to 1409 based on the results of that decision. The delay-processed rich or lean decision is made in step 1410. That is to say, in step 1410 a decision is made as to whether or not the count value of the second delay counter CDLY2 is less than or equal to 0. If CDLY2≦0, then this is taken to indicate that the air-fuel ratio is lean, and operation advances to step 1411 to 1416. On the other hand if it is found that CDLY2>0, then this is taken to indicate that the air-fuel ratio is rich, and operation advances to step 1417 to 1422.

In step 1411, the value of the counter TDR1 is decremented by one, that is to say, the rich delay time interval ($-$TDR1) is increased, so that the change from the lean to the rich condition is further delayed, as the air-fuel ratio is moved towards the rich condition. In steps 1412, 1413, a minimum value $T_{R1}$ is set for TDR1. $T_{R1}$ is a negative value, that is, ($-T_{R1}$) signifies the maximum rich delay time interval.

In step 1414, the counter value TDL1 is changed as TDL1←TDL1−1, that is to say, the lean delay time interval TDL1 is reduced, so that the delay in a change from the rich to the lean condition is made smaller, as the air-fuel ratio is moved towards the lean condition. In steps 1415, 1416, TDL1 is limited to a minimum value $T_{L1}$, which is a positive value, so that $T_{L1}$ signifies the minimum lean delay time interval.

If it is judged in step 1410 that the air/fuel ratio is rich, then step 1417 is executed, i.e. TDR1←TDR1+1. The rich delay interval ($-$TDR1) is thereby reduced, so that the delay in changing from the lean to the rich condition is made smaller, as the air/fuel ratio is moved toward the lean condition. In steps 1418, 1419, TDR1 is limited to a maximum value of $T_{R2}$, which is a negative value, so that ($-T_{R2}$) is the minimum rich delay interval.

In step 1420, TDL1 is changed to TDL1+1, i.e. the lean delay interval TDL1 is increased, so that a change from the rich to the lean condition is further delayed, as the air-fuel ratio is moved towards the lean condition. In steps 1421, 1422, TDL1 is limited to a maximum value $T_{L2}$, which is a positive value, so that $T_{L2}$ is a maximum lean delay interval.

After values for TDR1 and TDL1 have been calculated as described above, these are stored in the RAM 105, then operation advances to step 1425, and execution of the routine is terminated.

In steps 1423, 1424, TDR1 and TDL1 are set to respective fixed values. However it would be equally possible to set these to the respective values of TDR1 and TDL1 immediately prior to halting the air-fuel ratio feedback operation, or values that were established in accordance with other parameters, for example in accordance with the values of engine speed Ne, air intake rate Q, the air intake pressure, the exhaust gas temperature, etc. The values for FAF1, TDR1, TDL1 can also be calculated while air-fuel ratio feedback control is in progress, with the calculated values being temporarily stored in the back-up RAM 106. In that way, improved performance can be obtained after engine restarting, etc.

Figure 12:
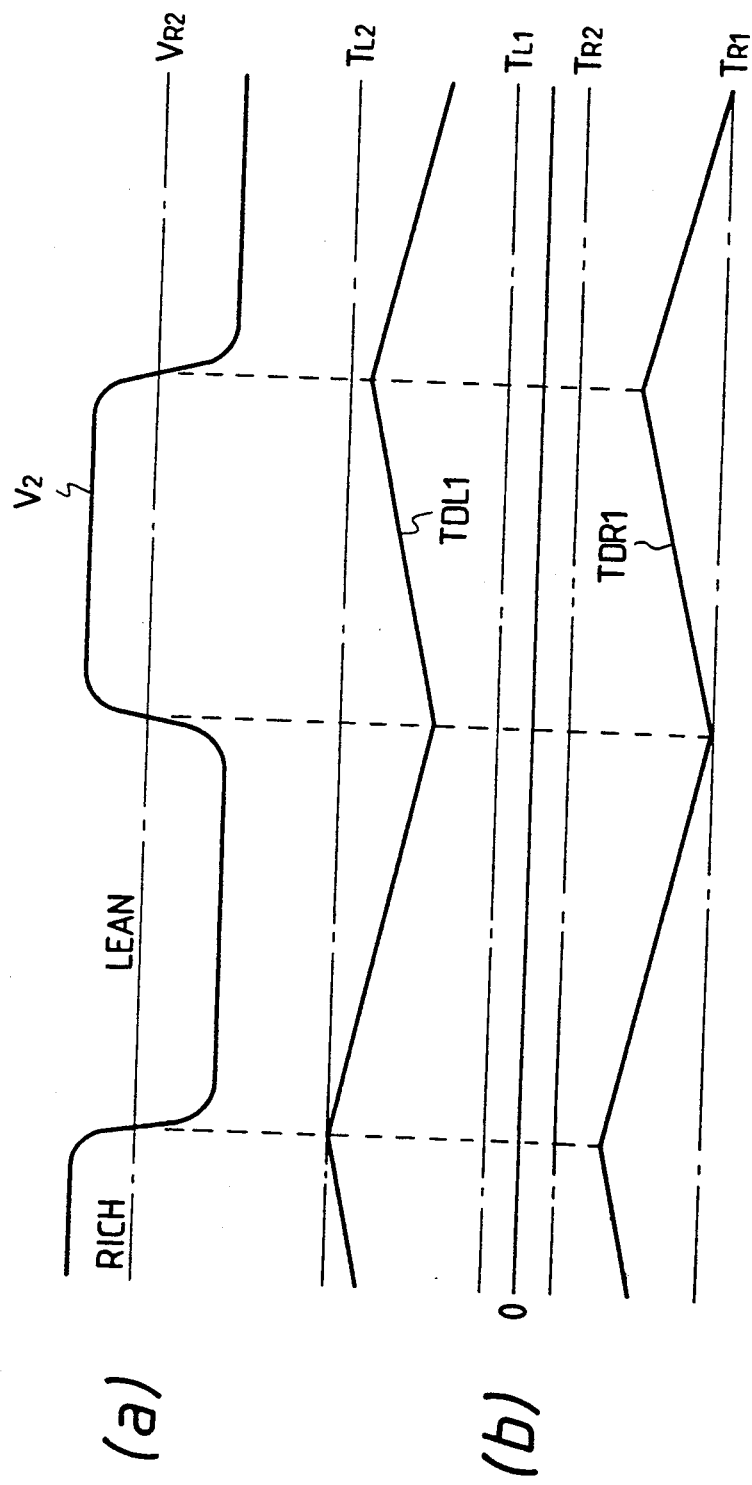
FIGS. 12a and 12b are timing diagrams for describing the operation of the routine of FIGS. 10, 11.

FIG. 12 is a timing diagram for the delay intervals TDR1 and TDL1 which are obtained in the flow chart of FIGS. 10, 11. When the output voltage $V_2$ from the downstream $O_2$ sensor 18 changes as shown in FIG. 12(a), then as shown in FIG.12(b), during each interval in which the air-fuel ratio is in the lean condition (i.e. $V_2 \leq V_{R2}$), the delay intervals TDR1 and TDL1 are both reduced, while during each interval in which the air-fuel ratio is in the rich condition, the delay intervals TDR1 and TDL1 are both increased. TDR1 changes within the limits $T_{R1}$ to $T_{R2}$, while TDL1 changes within the limits $T_{L1}$ to $T_{L2}$.

Figure 13:
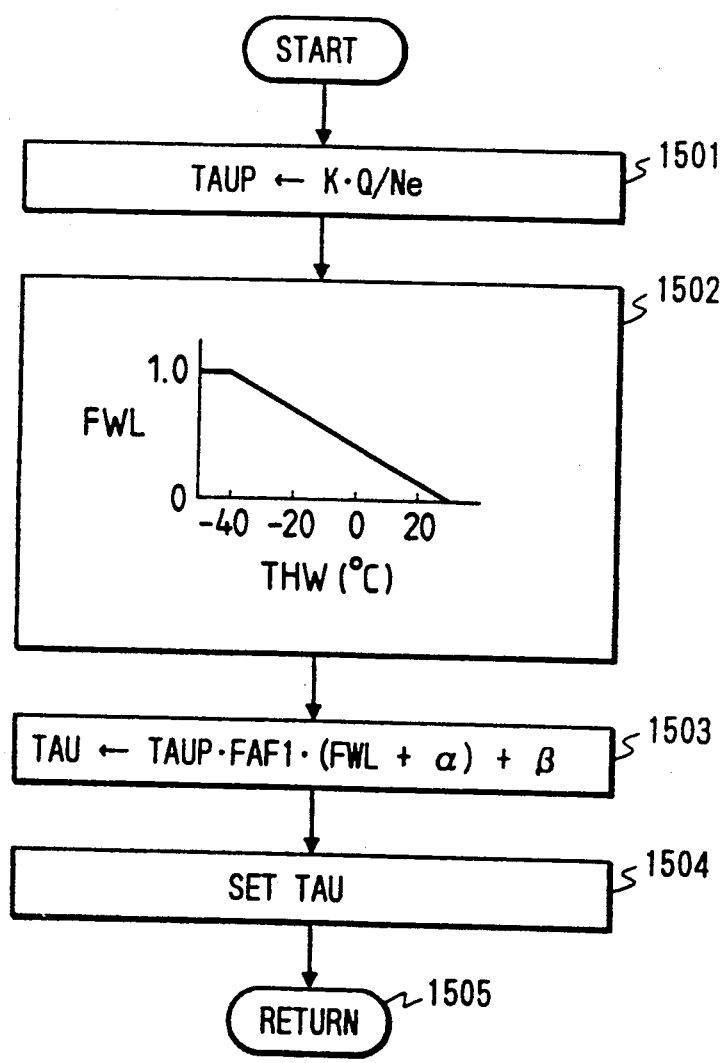
FIG. 13 is a flow chart of a routine which is executed for computing values of fuel injection quantity.

Control of the fuel injection interval, i.e. fuel injection quantity, is executed as follows. FIG. 13 shows a fuel injection calculation routine, which is executed each time a specific crank angle is reached, for example each time the crank angle has changed by 360°. In step 1501, the intake air rate Q and the engine speed data Ne are read out from the 105×, and the basic fuel injection quantity TAUP is calculated. For example this can be calculated as:

TAUP←K.Q/Ne, where K is a constant. In step 1502, the cooling water temperature data THW are read out from the 105×, and the engine warm-up increase amount FWL is calculated by interpolation, using a 1-dimensional map that is stored in the ROM 104. In step 1503, the final fuel injection quantity TAU is calculated as:

TAU←TAUP.FAF1.(FWL+α)+β

In the above, and are respective compensation values that are determined based on other engine operating parameters.

Next in step 1504, the fuel injection quantity TAU is set into a down counter 108, and the flip-flop 109 is set, whereupon fuel injection is started. In step 1505, the routine is terminated.

Calculation of amplitude and period of $O_2$ sensor output signals is carried out as follows.

Figure 14:
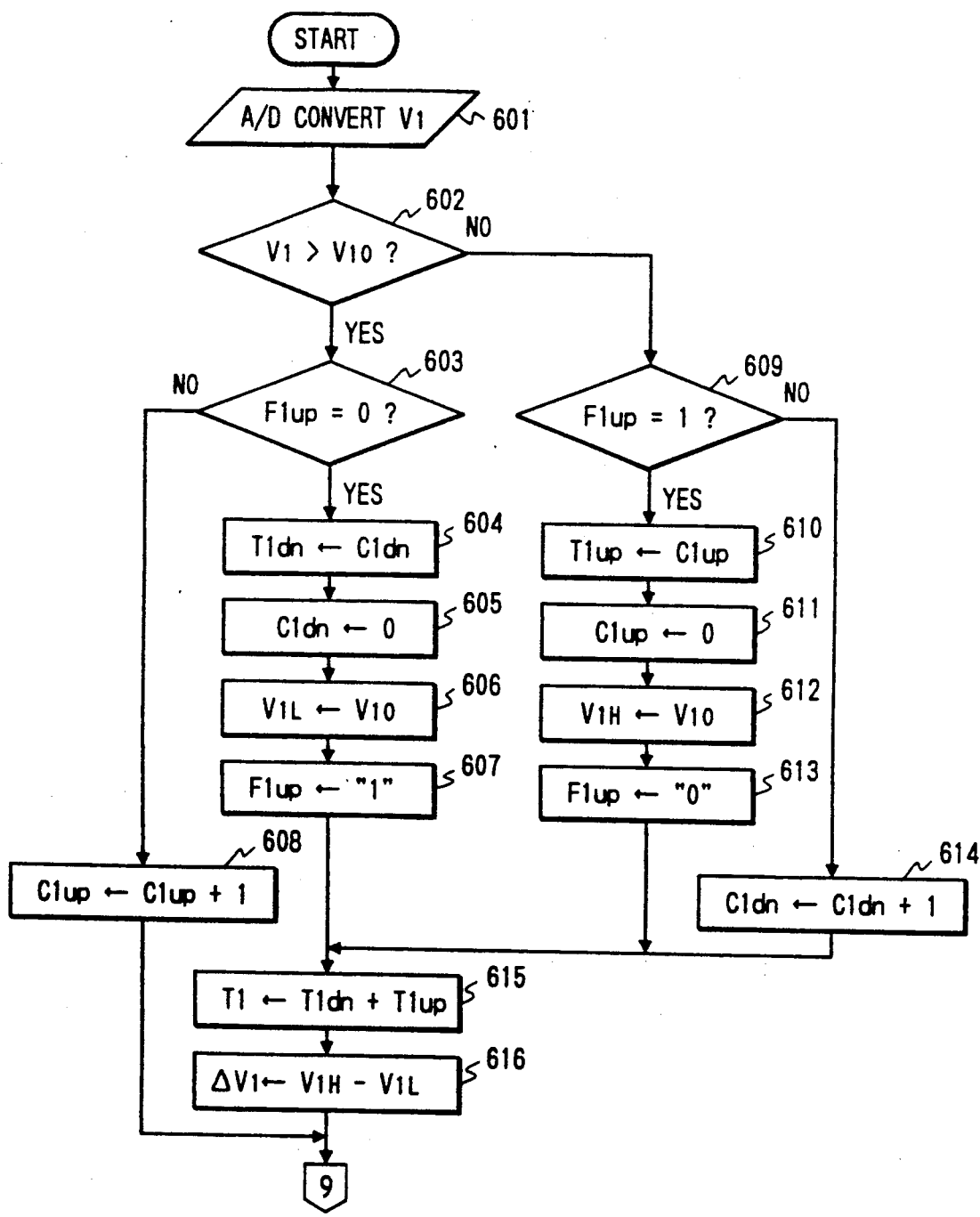
FIGS. 14, 15 constitute a flow chart of a routine which is executed for computing the respective values of amplitude and period of output signals produced from the upstream $O_2$ sensor and downstream $O_2$ sensor.
Figure 15:
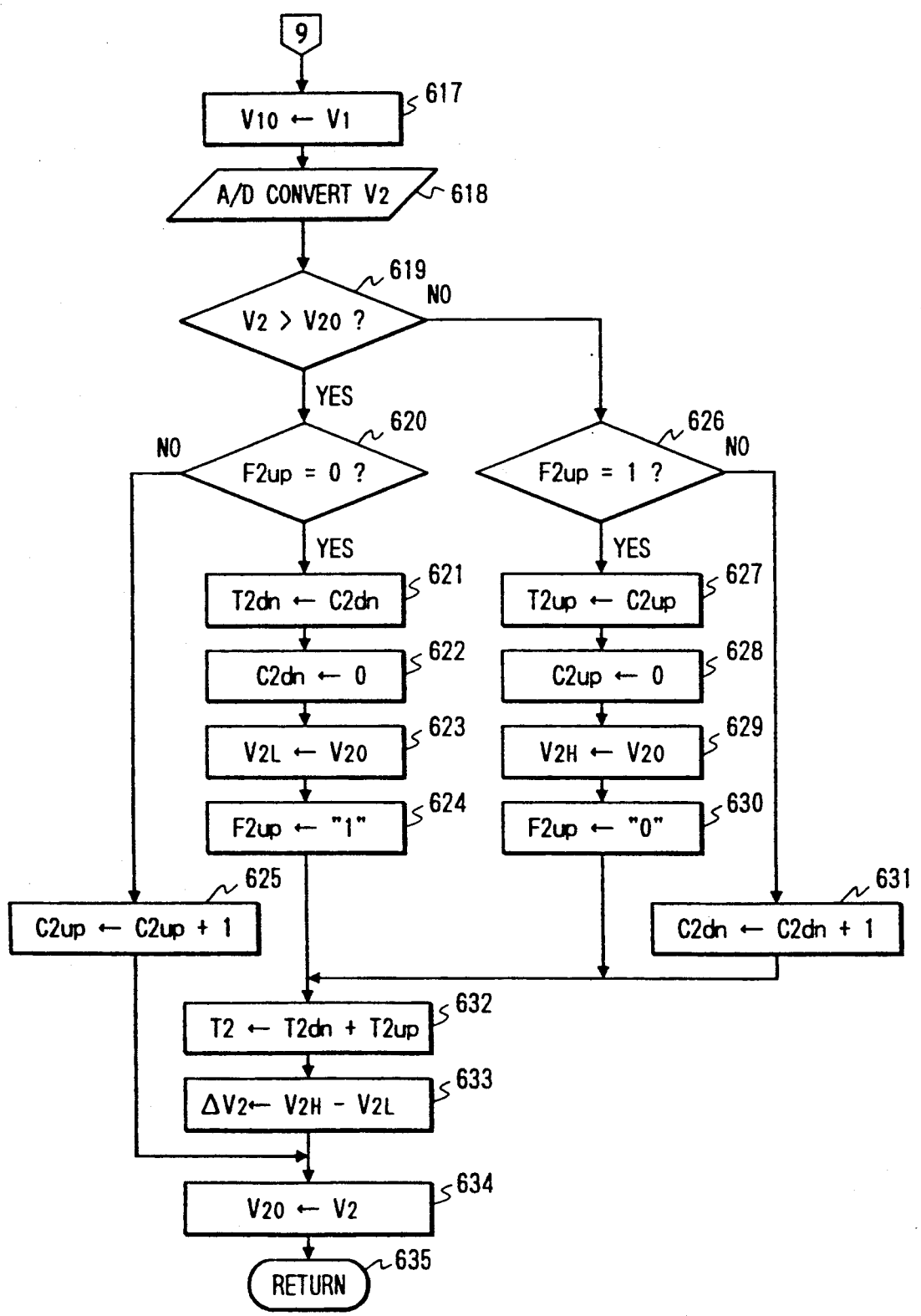

FIGS. 14, 15 show the routine that calculates values of $O_2$ sensor output amplitude and period. This routine is executed periodically at intervals of 4 ms. In steps 601 to 607, processing of the output from the upstream $O_2$ sensor 16 is executed. In steps 618 to 625, processing of the output from the downstream $O_2$ sensor 18 is executed.

In step 601, the output $V_1$ from the upstream $O_2$ sensor 16 is subjected to analog/digital conversion, and in step 602 the value of $V_{10}$ which was obtained in the proceeding execution of this routine (designated as $V_{10}$) and the value $V_1$ obtained in the current execution are compared. If $V_1 > V_{10}$, i.e. there has been an increase, then in step 603 a decision is made as to whether or not the flag F1up is in the "0" state, whereas if $V_1 < V_{10}$ (i.e. there has been a reduction), then in step 609 a decision is made as to whether or not the flag F1up is "1". If it is found that the flag F1up is "1", then this indicates that the output voltage $V_1$ from the upstream $O_2$ sensor 16 is increasing. Accordingly, if it is found in step 603 that F1up="0", then since this indicates that the output $V_1$ from the upstream $O_2$ sensor 16 has changed over from the decreasing to the increasing condition, while if it is found in step 603 that F1up="1", then this indicates that the output $V_1$ is continuing to increase.

If it is found in step 609 that the flag F1up="1", then this signifies that the output voltage $V_1$ has changed over from the increasing to the decreasing state, while if it is found that F1up="0", then this indicates that the output $V_1$ is continuing to decrease.

If the output voltage $V_1$ from the upstream $O_2$ sensor 16 is found to be continuing to increase, then operation advances to step 608, in which the increase interval counter C1up is incremented by 1, while if the output $V_1$ is found to be continuing to decrease, then operation advances to step 614 in which the decrease interval counter C1dn is incremented by 1.

Figure 16:
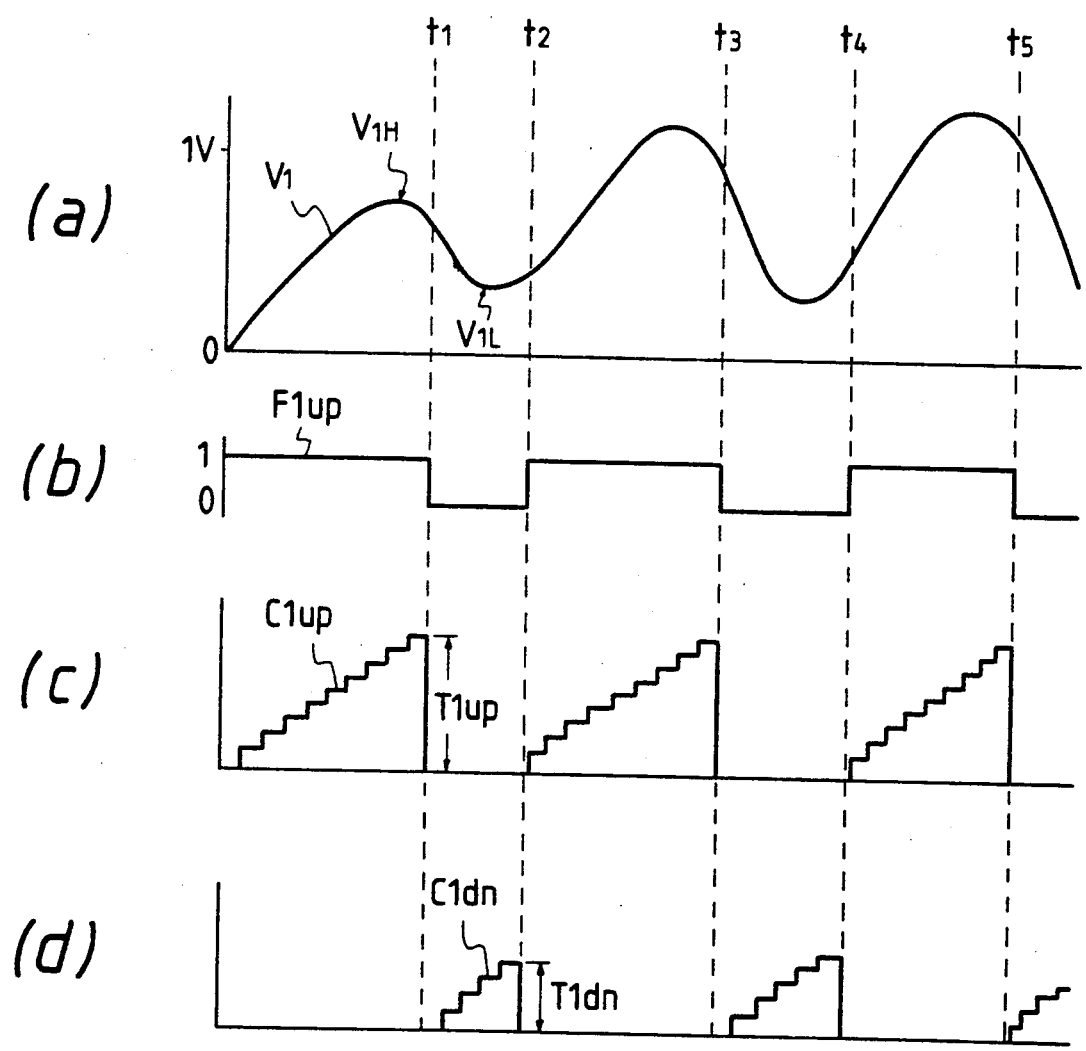
FIGS. 16a–16d are timing diagrams for describing counting and flag setting operations that are executed in the flow chart of FIGS. 14, 15.

In this way, as shown in FIG. 16, the increase interval counter C1up and the decrease interval counter C1dn are respectively incremented in accordance with whether the output voltage $V_1$ is increasing or decreasing.

If the output voltage $V_1$ from the upstream $O_2$ sensor 16 is found to have changed from the increasing to the decreasing condition (for example as occurs at the time points t2, t3, t4 in FIG. 16), then the steps 604 to 607 and 615, 616 are executed. In step 604, an operation is executed on the decrease interval T1dn, of the form T1dn−C1dn. In step 605, the decrease interval counter C1dn is cleared, in step 606 a minimum value for $V_1$ is established as $V_{1L} - V_{10}$, and in step 607 the state of the flag F1up id inverted. In step 615, a new value for the period T1 of the output $V_1$ from the upstream $O_2$ sensor 16 is calculated as:

$$T1 = T1dn + T1up$$

In step 616, the amplitude $V_1$ is calculated as:

$$V_1 = V_{1H} - V_{1L}$$

In the above, $V_{1H}$ is calculated based on the maximum value of the output $V_1$ from the upstream $O_2$ sensor 16.

If on the other hand the output $V_1$ from the upstream $O_2$ sensor 16 has changed from the increasing to the decreasing condition (as occurs for example at the time points t1, t3, etc, in FIG. 16) then the steps 610 to 613, 615, 616 are executed. In step 610, the increase interval T1up is calculated as T1up=C1up. In step 611, the increase period counter C1up is cleared, in step 612 the maximum value of $V_1$ is calculated as $V_{1H} = V_{10}$, and in step 613 the flag F1up is inverted. In step 615 the period T1 of the output $V_1$ of the upstream $O_2$ sensor 16 is calculated, and in step 616 the amplitude $\Delta V_1$ of $V_1$ is calculated.

Similarly, the period T2 and the amplitude $\Delta V_2$ of the output $V_2$ from the downstream $O_2$ sensor 18 are respectively calculated by the flow of operation in the steps 618 to 634.

In step 635, the routine of FIGS. 14, 15 is terminated.

Judgment of the amplitude of output signal from the $O_2$ sensor 18 is performed as follows.

Figure 17:
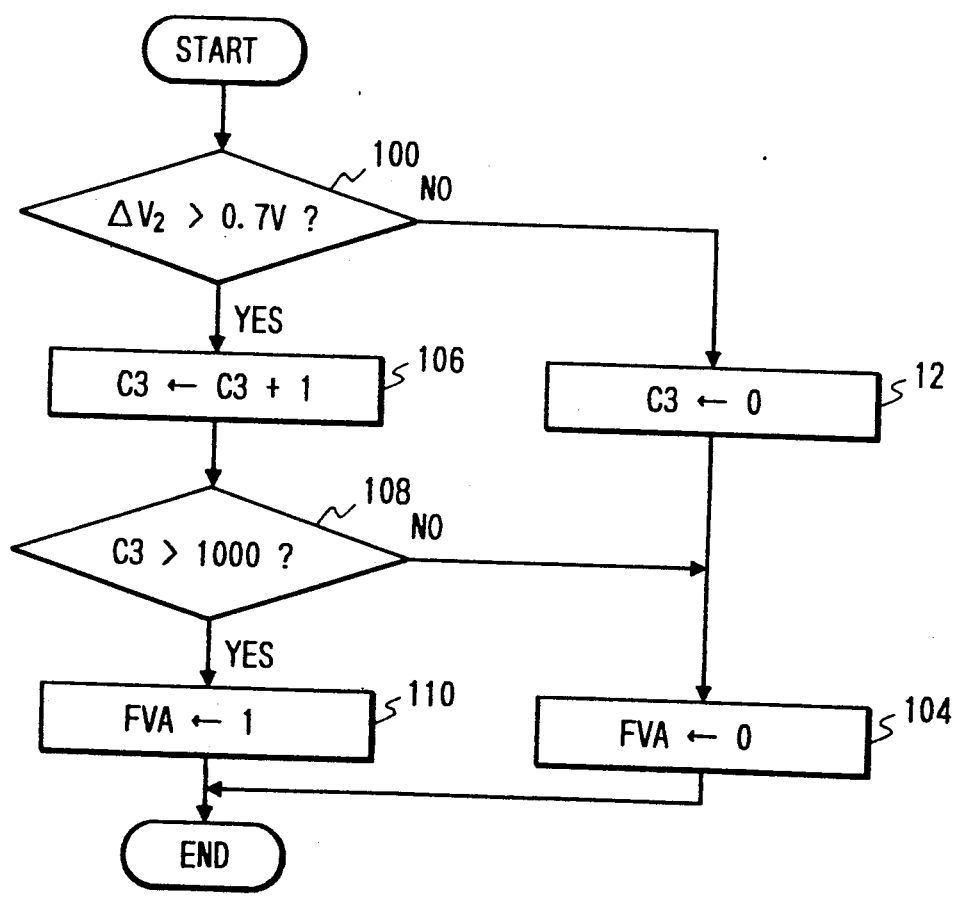
FIG. 17 is a flow chart of a routine which is executed for detecting whether or not the output signal from the downstream $O_2$ sensor is above a predetermined threshold voltage level.

The routine shown in FIG. 17 is executed at 4 ms intervals, with each execution following an execution of the $O_2$ sensor amplitude and period measurement routine of FIGS. 14, 15.

In step 100, a decision is made as to whether or not the amplitude $\Delta V_2$ of the output from the downstream $O_2$ sensor 18 is greater than a threshold value of 0.7 V. If $\Delta V_2$ is found to be greater than 0.7 V, then step 102 is executed in which the counter C3 is cleared, followed by step 104 in which a failure detection flag FVA is reset. The counter C3 serves to measure a time for which the amplitude $\Delta V_2$ of the output from the downstream $O_2$ sensor 18 continuously exceeds the 0.7 V value, and when that measured time interval exceeds a predetermined value (in the present embodiment, 4 seconds) the FVA flag is set to the "1" state, to indicate that failure has been detected.

If it is judged in step 100 that the amplitude $\Delta V_2$ of the output from the downstream $O_2$ sensor 18 is greater than 0.7 V, then operation advances to step 106, in which the counter C3 is incremented by 1. In the next step 108, a decision is made as to whether or not the value of the counter C3 has exceeded 1,000. If the count value has not exceeded 1,000, then the failure detection flag FVA is set to "0" in step 914, whereas if the counter C3 value exceeds 1,000 then in step 110 the failure detection flag FVA is set to "1".

Figure 18:
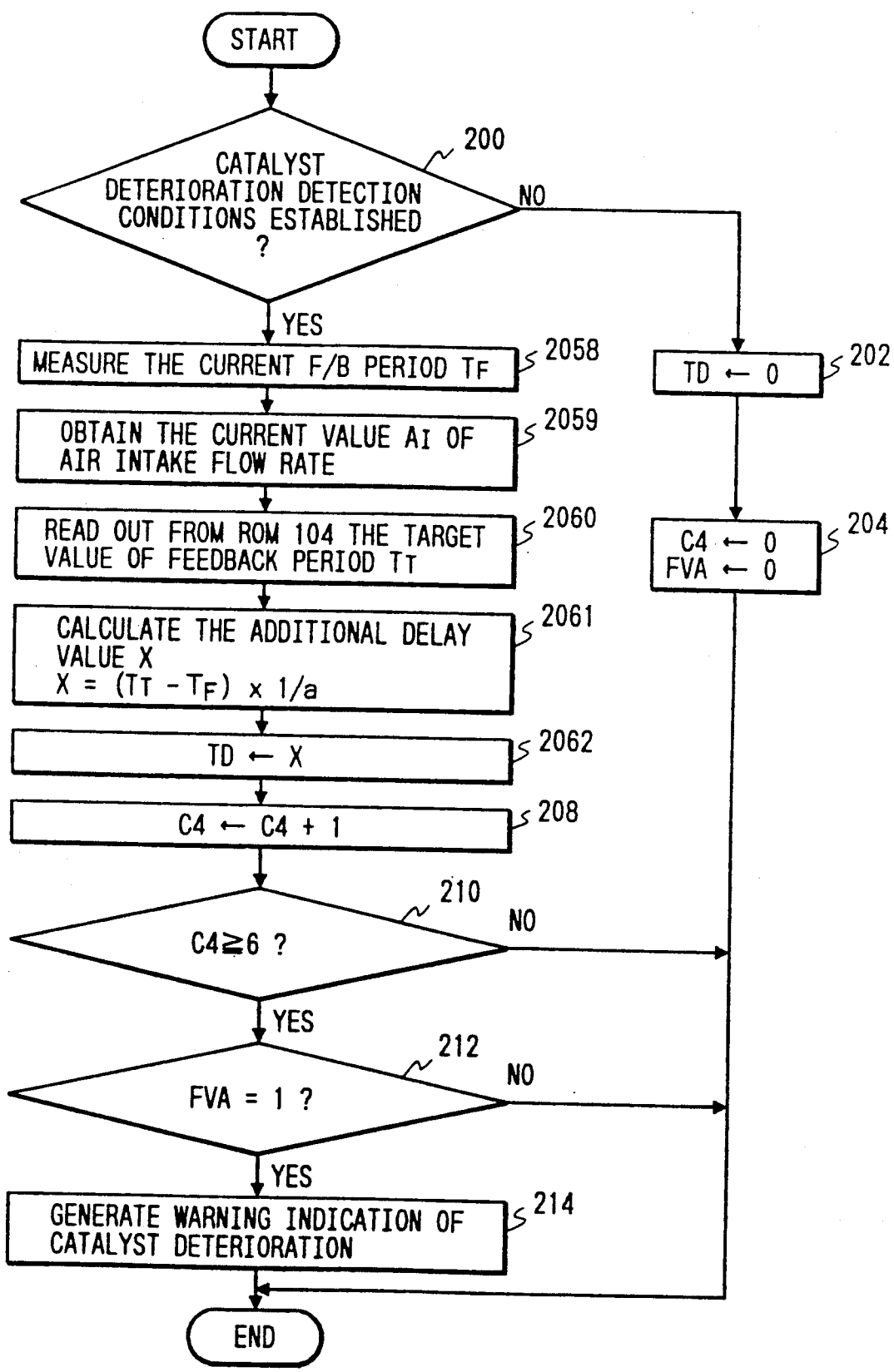
FIG. 18 is a flow chart of a routine which is executed for detecting catalyst deterioration based on the detection result obtained in the flow chart of FIG. 17.

Control of catalyst deterioration detection is executed as follows. FIG. 18 shows a routine that is executed at intervals of 500 ms for detecting deterioration of the catalyst, i.e. judging the purification factor of the catalyst.

In step 200, a decision is made as to whether or not the catalyst deterioration detection conditions are established. In this embodiment, the catalyst deterioration detection conditions are as follows, all of which must be satisfied simultaneously:
(1) The engine speed of rotation is within a predetermined range.
(2) The engine load (as indicated by the air intake rate) is within a predetermined range.
(3) The vehicle driving conditions are stable
(4) Air/fuel ratio feedback control is being executed.
(5) The conditions (1) to (4) have all been established continuously for a predetermined interval (10 seconds).
(6) A predetermined time interval (for example 60 seconds) has elapsed since the last time that catalyst deterioration detection control was executed.

if it is found in step 200 that the catalyst deterioration detection conditions are not satisfied, then step 202 is executed, in which the delay operational quantity TD is set to 0, then in step 204 the counter C4 is cleared to "0", and the failure detection flag FVA is also cleared to "0". By setting the delay operational quantity TD to "0", the feedback period is set to the optimum period for normal engine control. In addition, by clearing the failure detection flag FVA to "0" if it is found in step 200 that a catalyst deterioration detection operation is not to be initiated, there is no danger of that flag becoming accidentally set to the "1" state during normal engine control operation.

If it is judged that the conditions for catalyst deterioration are established, in step 200, then operation advances to a step 2058 of obtaining the current value $A_I$ of air flow rate of the engine, then a step 2059 of reading out from a memory map stored in the ROM 104 an appropriate target value $T_T$ of period to which the feedback period is to be changed. It is necessary to select the value of $T_T$ in accordance with the intake air flow rate, since as described hereinafter the appropriate target value will vary to some extent in accordance with the engine intake air flow rate.

Operation the proceeds to steps 2060 to 2061, in which an additional delay interval X is calculated, where X is the value to which TD is to be set in order to change the feedback period during a catalyst deterioration detection operation to a suitable value. First in step 2060, the current value of feedback period $T_F$ is obtained. Specifically, that period has been measured immediately prior to execution of the routine of FIG. 18 and stored in memory, by a routine which measures the feedback period by by a counting operation. That can be done for example by measuring the interval which elapses between two successive points at which the F/B correction coefficient FAF1 shown in diagram (d) of FIG. 9 is changed (by the skip amount RS1) from the condition producing decrease of the fuel injection quantity to the condition producing increase of that quantity. In step 2061, based on the relationship between that current feedback period $T_F$ and the target period $T_T$ which is of the form shown shown in FIG. 5 and is held in RAM 104 as a memory map, the required additional amount of delay time X, to which TD must be set in order to bring the feedback period to the target value $T_T$, is calculated. The requisite additional delay interval X is calculated from the difference between $T_T$ and $T_F$ using the following equation:

$$X = (T_T - T_F) \times 1/a$$

In the above, "a" is the slope of the characteristic that is shown in FIG. 27. That characteristic has been established by the assignees of the present invention, as a result of experiments. In the next step 2062, the delay operational quantity TD is set to the value X that has been calculated. The rich/lean delay times which are applied to the output from the upstream $O_2$ sensor 16 are thus increased by this new value of the delay operational quantity TD. as shown in diagram (c) of FIG. 9, and air-fuel ratio feedback control that is executed thereafter is based on the output signal from the upstream $O_2$ sensor that has been delayed by the amount TDL1+TD and −TDR1+TD, so that the feedback period will be changed to the target period $T_T$.

Next, in step 208, the counter C4 is incremented by one, then in step 210, a decision is made as to whether or not the count value of the counter C4 is greater than 6. If C4>6, i.e. if at least 3 seconds have elapsed since the value of TD was first changed in step 2062, then in step 212 a decision is made as to whether or not catalyst deterioration has been detected, by determining whether or not the failure detection flag FVA is in the "1" state. If FVA="1", then that indicates catalyst failure, and operation then advances to step 214, in which an command is sent to the alarm 19 to indicate that there is a catalyst failure, and a warning display is produced.

It can be understood that each catalyst deterioration detection operation by the first embodiments is based on six successive executions of the routine of FIG. 18. In the first execution, i.e. after it has been determined in step 200 that a detection operation is possible, the value of TD is changed from 0 to the calculated value X. The counter C4 is then incremented (i.e. to a count of 1), and that execution of the routine is terminated. Thereafter, the engine is operated with delay times of −TDR1+TD and TDL1+TD used to derive the delayed air-fuel ration signal A/F1' shown in diagram (c) of FIG. 9. Hence, the feedback period is increased, to become the target period, as a result of the delay increase provided by TD. Thereafter, the routine of FIG. 18 is repeated four times in succession, but with substantially no action occurring in these executions, assuming that there is no change in the target period (since NO decisions are reached in step 210). In the sixth execution, if the flag FVA has been set to 1 by the routine of FIG. 17 described hereinabove, a failure detection warning will be issued in step 214. The four executions of the routine of FIG. 18 which are executed between the first and fourth executions serve essentially provide a time delay, to ensure that the engine has been operating for a sufficient length to stabilize the feedback period at the target value $T_T$, before failure is judged on the basis of the amplitude of the output signal from the downstream $O_2$ sensor 18.

The principles whereby catalyst failure detection is based on the output amplitude from the downstream $O_2$ sensor 18, with the first embodiment described above, will be described referring to FIG. 20. This shows the relationship between the amplitude $V_2$ of the output $V_2$ from the downstream $O_2$ sensor 18 and the catalyst purification factor, with the feedback frequency as a parameter, i.e. with the $\Delta V2$ amplitude/purification factor characteristics corresponding to three different values of feedback period being shown. These are respectively a normal value of feedback period, a value which is significantly longer than the normal value (which can be assumed to be, for example, the aforementioned target value of feedback period which is used during a catalyst deterioration detection operation), and a value which is significantly shorter than the normal period. As shown, for each specific value of feedback period, the lower becomes the catalyst purification factor, the greater becomes the amplitude $\Delta V_2$. For a specific value of feedback period, when the purification factor becomes smaller than a certain value, the amplitude $\Delta V_2$ will become saturated, i.e. $\Delta V_2$ cannot become greater than the saturation value (in this example, assumed to be 1 V).

With the first embodiment of the invention described above, a certain minimum permissible value of catalyst purification factor is predetermined, as a reference purification factor value. That might for example be the purification factor value $F_B$ shown in FIG. 20, assuming that the actual value of the catalyst purification factor is $F_A$. The required value for the target feedback period $T_T$ is established as follows. Firstly, a threshold voltage value (in this example, 0.7 V) is selected. A value of feedback period is then determined, as a feedback period for which the output signal amplitude $\Delta V2$ from the downstream $O_2$ sensor 18 will coincide with the threshold voltage when the purification factor is equal to the reference value. In the first embodiment described above, that target feedback period $T_T$ (which might be, for example, the feedback period indicated as "long" in FIG. 20) is longer than the normal feedback. Thus, when the feedback period is changed to that target value $T_T$, if the detected value of $\Delta V2$ is found to be higher than that threshold value, the catalyst will be judged to have deteriorated excessively, i.e. a decision of catalyst failure will be reached.

It can be understood that as a result of lowering the feedback period during the catalyst deterioration detection operation, the slope of the characteristic is made more steep, so that a greater accuracy is achieved of discriminating values of purification factor that are close to the reference value.

It can also be understood that the value of target period must be determined based upon the particular value of reference purification factor that is to be used and upon the form of the amplitude $\Delta V2$/purification factor characteristic, to ensure that the threshold voltage level does not become too close to the saturation value, while optimizing the discrimination conditions as far as possible (e.g. by using a steeply sloping characteristic).

In the above, it has been assumed that a single value of target feedback will result in the amplitude $\Delta V1$ reaching the threshold voltage level when the purification factor is equal to the reference value. However in fact, the target feedback period value will vary to a certain extent in accordance with the air intake flow rate of the engine. For that reason, as described for step 205B of Fig. 18, appropriate values for the target feedback period $T_T$ at various different air flow rates are stored as a memory map in the ROM 104, so that a value of $F_T$ which provides maximum detection accuracy can be obtained and used in step 2061.

The purification factor that is used as a reference value will vary, depending upon the particular type of catalytic converter 15.

Figure 20:
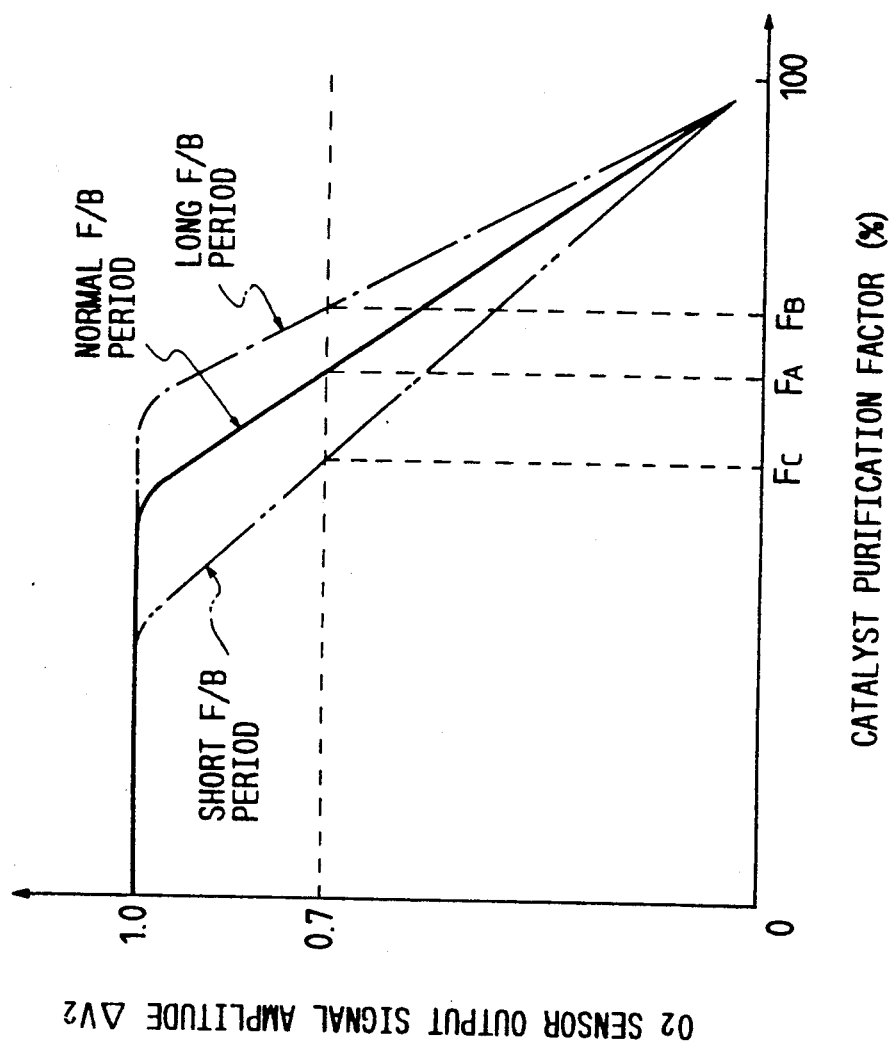
FIG. 20 shows characteristic relationships between values of output signal amplitude from the downstream $O_2$ sensor and values of catalyst purification factor, for different values of feedback period.

In the above description, it has been assumed that the reference value of purification factor and the amplitude V2/purification factor characteristic are related in a similar manner to the purification factor value $F_B$ and the "normal feedback period" characteristic shown in FIG. 20. However it is possible for example that these could be for example, the purification factor value $F_C$ and the "normal feedback period" characteristic of FIG. 20. In the case of such a relationship, it would be necessary to reduce the feedback period during a catalyst deterioration detection operation, in order to ensure that the threshold voltage will become an appropriate value, such as 0.7 V, which is sufficiently lower than the saturation voltage level. Thus in that case, to set the feedback period to the target value, it would be necessary to reduce the amount of delay applied to the transitions of the output signal from the upstream O2 sensor 16, instead of increasing that delay, i.e. the delay operational quantity TD would be set to an appropriate negative value.

A second embodiment of the invention will be described. With this embodiment, the feedback period is increased by successive small amounts, during catalyst deterioration detection, and detection of the catalyst deterioration is based on the feedback period at which the amplitude $\Delta V_2$ of the output form the downstream O2 sensor 18 exceeds a threshold value (0.7 V).

The overall configuration, method of air-fuel ratio feedback control, and method of calculation of O2 sensor output amplitude and period are each identical to those of the first embodiment described above.

Judgement of the amplitude of output signal from the downstream O2 sensor 18 is executed in the same way as for the first embodiment, i.e. by the routine of FIG. 17. That is, if the amplitude $\Delta V_1$ of the output from the downstream O2 sensor 18 has continuously exceeded the predetermined threshold valve (e.g. 0.7 ) for a predetermined time interval, then the failure detection flag FVA is set to "1".

Figure 21:
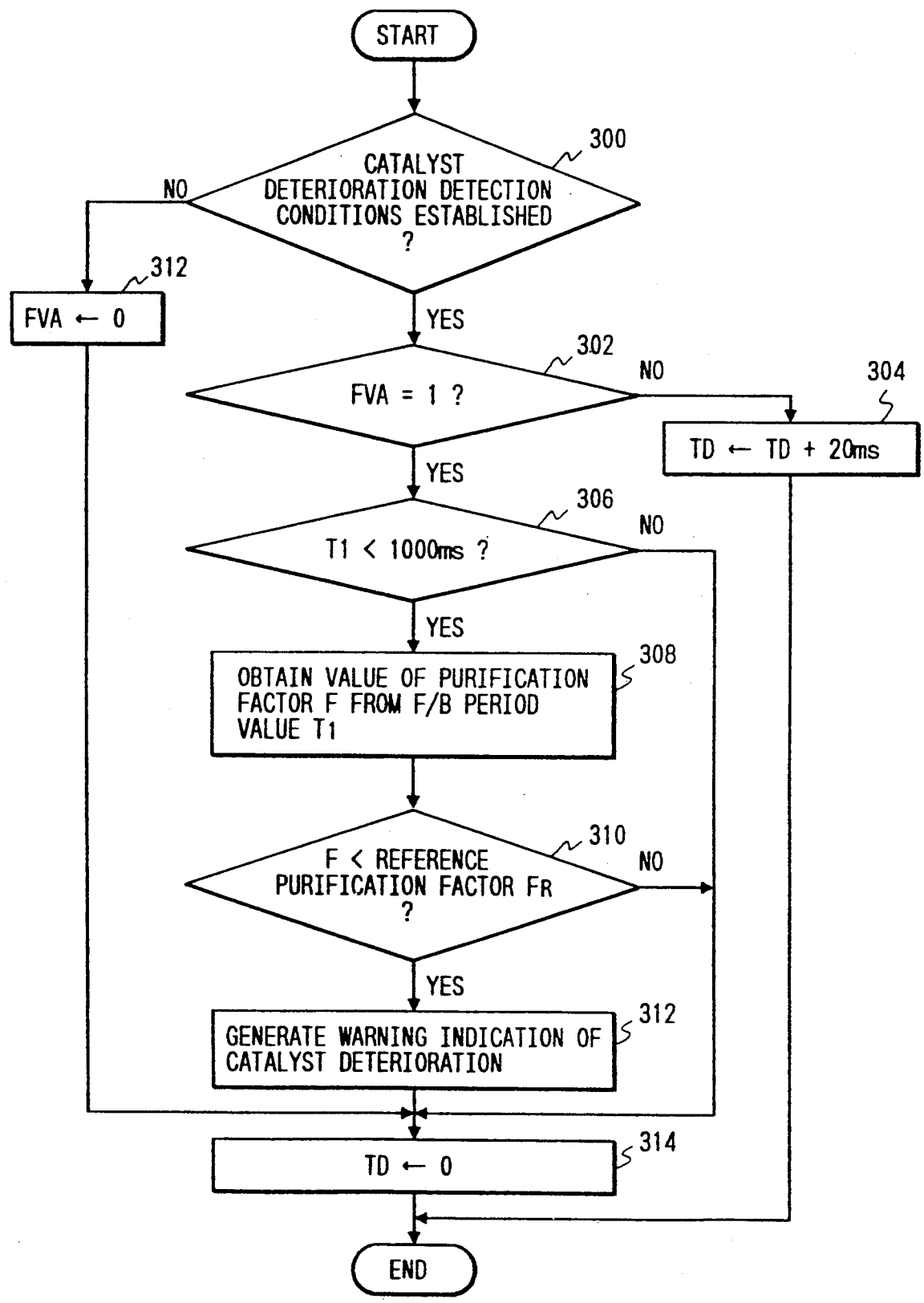
FIG. 21 is a flow chart of a routine which is executed for detecting catalyst deterioration, according to a second embodiment of the present invention.

With the embodiment, control of catalyst deterioration detection is executed in accordance with the routine shown in FIG. 21, which is executed once in every 500 ms.

In step 300, a decision is made as to whether or not the conditions for detection of catalyst deterioration are established. The catalyst deterioration detection conditions are the same as those described hereinabove for the first embodiment, i.e. the same as the judgment conditions of step 200 in FIG. 18.

If it is found in step 300 that the catalyst deterioration detection conditions are not satisfied, then operation advances to step 312, in which the failure detection flag FVA is reset to 0 then in step 314 the delay operational quantity TD is set to 0. That is to say, ad for the case of the routine of FIG. 18 described above, there is a possibility that the failure detection output will be set to "1" even when normal air-fuel ratio current is in progress. In order to prevent that from occurring, during normal air-fuel ratio control the failure detection flag FVA is reset to "0". Moreover due to the fact that the delay operational quantity TD is reset to 0, the feedback period is set to the value that is optimum for normal air-fuel ratio control.

If it is found in step 300 that the catalyst deterioration detection conditions are established, then operation advances to step 302, in which a decision is made as to whether or not the failure detection flag FVA is set to "1". If the flag is not set to "1", then operation advances to step 304, and 20 ms is added to the delay operational quantity TD, whereupon the routine execution is terminated. Thus with this processing, as described for the first embodiment, the feedback period is corrected in a direction such as to produce a lengthening of that period, as a result of subsequent executions of the routine shown in FIGS. 7, 8. However in this embodiment, the feedback period is lengthened by a fixed small amount in each of successive executions of th routine shown in FIG. 21, since TD is increased by only 20 ms in each execution.

So long as it is judged in each execution of step 300 that the catalyst deterioration detection conditions are established, and the failure detection flag FVA is not set to "1", the step 300, 302 and 304 of the routine of FIG. 21 are repetitively executed, once every 500 ms. As a result, the delay operational quantity TD is gradually increases, so that the feedback period is gradually increases. Due to this lengthening of the feedback period, the period $V_2$ of the output from the downstream O2 sensor 18 will at some point come to exceed the threshold value of 0.7 V, so that the failure detection flag FVA will then be set to "1" by the routine shown in FIG. 17.

When that condition is detected in step 302, in the routine of FIG. 21, operation advances to step 306, in which a decision is made as to whether or not the output period T1 of the upstream O2 sensor 16, which was detected by the routine of FIGS. 14, 15 (and which can be regarded as the feedback period) is less than 1,000 ms. If that period T1 is found to be greater than 1,000 ms, then the amplitude of the output from the downstream O2 sensor 18 will reach the saturation level of 1 V even if there is a high level of purification factor of the catalyst, i.e. even if a failure condition does not exist. However with the routine of FIG. 21 that will not be erroneously judged as a failure condition, since if there is a "no" decision in step 306 operation then operation advances to step 314, in which the delay operational quantity TD is reset to zero. Thus the feedback period is returned to the appropriate value for normal air-fuel ratio control operation.

Figure 22:
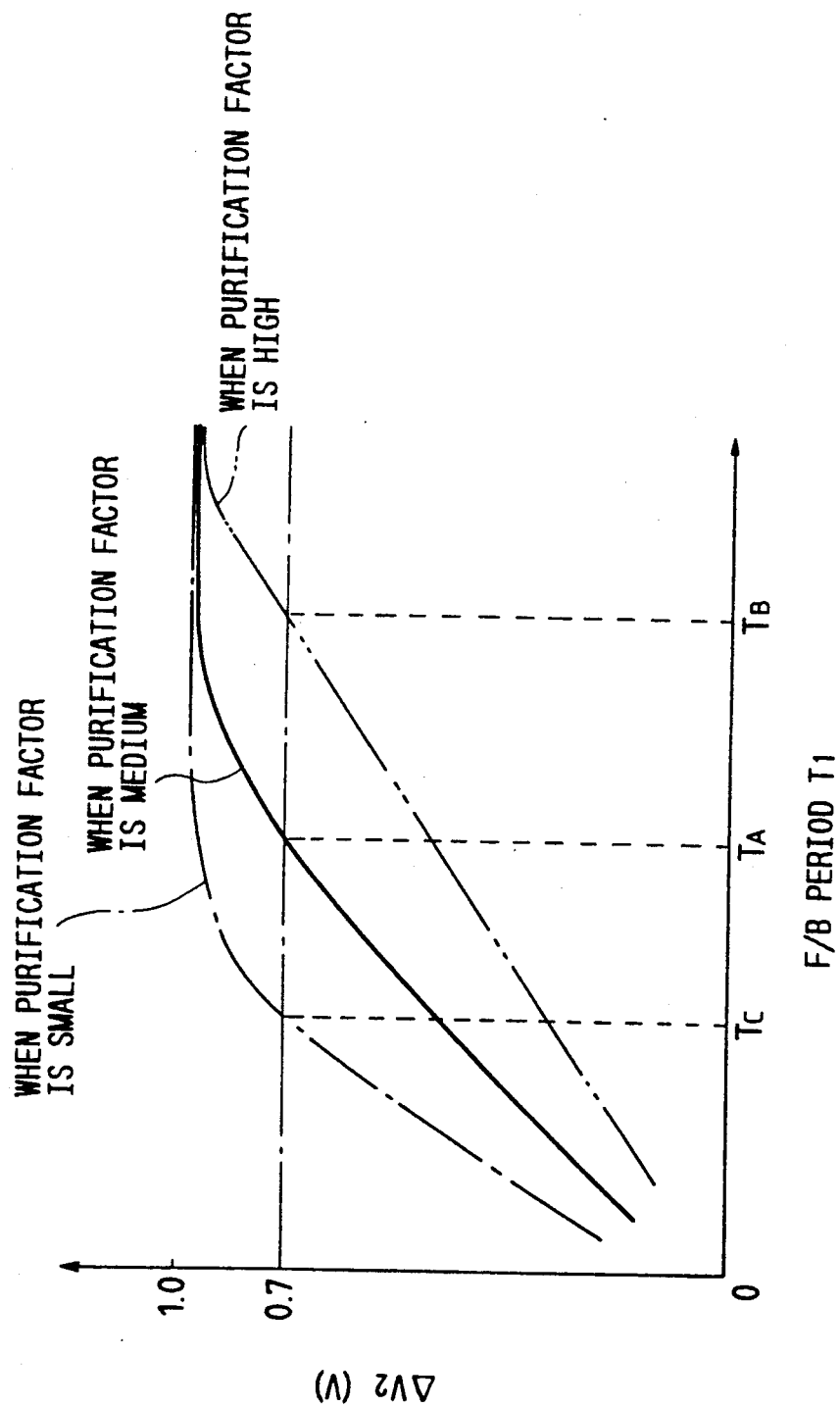
FIG. 22 shows characteristic relationships between values of output signal amplitude from the downstream $O_2$ sensor and values of feedback period, for different values of catalyst purification factor.

However if it is judged in step 306 that the period T1 of the output from the upstream O2 sensor 16 is less than 1,000 ms, then operation advances to step 308, in which the purification factor X of the catalyst corresponding to that value of period T1 is obtained. The relationship between the feedback period and the output amplitude $\Delta V_2$ from the downstream $O_2$ sensor 18 is shown in FIG. 22, with the purification factor of the catalyst as a parameter. By using that characteristic, it becomes possible to measure the purification factor F of the catalyst, based on the specific feedback period at which the amplitude $\Delta V_2$ of the output from the downstream $O_2$ sensor 18 is found to exceed the threshold value, which in this example is 0.7 V. The relationship between values of feedback period and values of the purification factor F is stored beforehand, as a memory map, with the ROM 104.

In the next step 310, the value of purification factor F that has thus been obtained is compared with a reference value purification factor $F_R$. If the detected purification factor is less than the reference purification factor, then operation advances to step 312 in which a failure designation command is sent to the alarm 19, to produce a warning indication. If it is found in step 310 that the value of the purification factor F exceeds the reference purification factor $R_R$, then operation advances to step 314 in which the delay operational quantity TD is reset to "0", so that the feedback period is returned to the appropriate value for normal air-fuel ratio control operation.

In that way, with this embodiment, the feedback period of the air-fuel ratio control is gradually increased, and the purification factor of the catalyst is obtained based on the feedback period at which the output amplitude $\Delta V_2$ from the downstream $O_2$ sensor 18 exceeds the threshold value (e.g. 0.7 V).

With this embodiment, the period T1 of the output from the upstream $O_2$ sensor 16 is detected to obtain the feedback period. However it would be equally possible to use the routine of FIGS. 7, 8, whereby the feedback period is obtained by measuring the period between successive rising edges of the F/B correction coefficient FAF1. i.e. the period of time points at which step increases of the F/B correction coefficient FAF1 occur as a result of the skip quantity RS1.

A third embodiment of the invention will now be described. With this embodiment, as for the first embodiment described above, the air-fuel ratio feedback period is increased by a specific substantial amount, during a purification factor measurement operation, by comparison with the feedback period which occurs during normal emission control. The phase difference between the output signals from the upstream $O_2$ sensor 16 and the downstream $O_2$ sensor 18 is measured, and the purification factor of the catalyst is measured based on that phase difference.

The overall configuration of apparatus is the same as for first embodiment, as is the method of air-fuel ratio feedback control.

Figure 23:
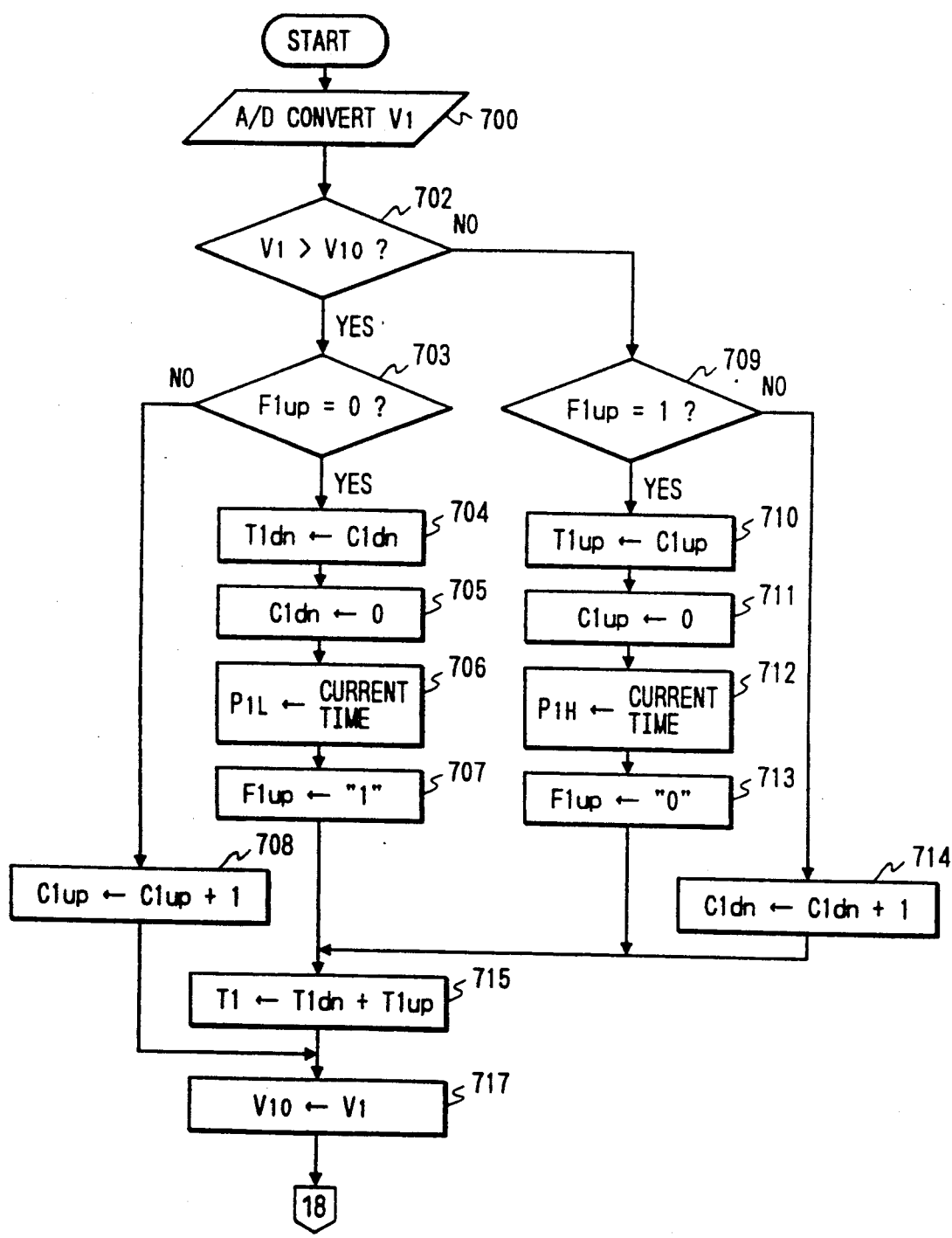
FIGS. 23, 24, 25 constitute a flow chart of a routine which is executed for measuring an amount of phase difference between output signals from the upstream $O_2$ sensor and the downstream $O_2$ sensor.
Figure 24:
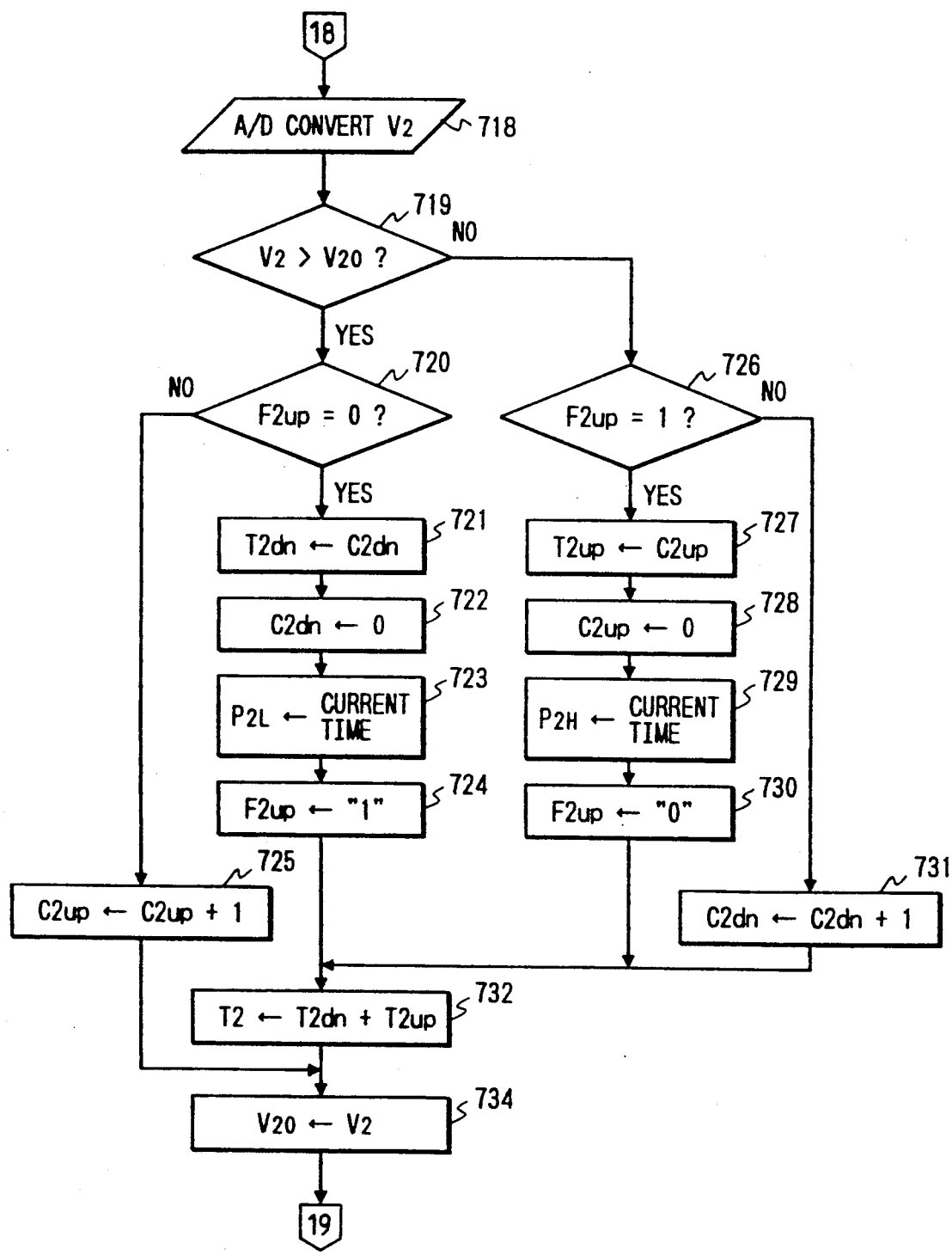
Figure 25:
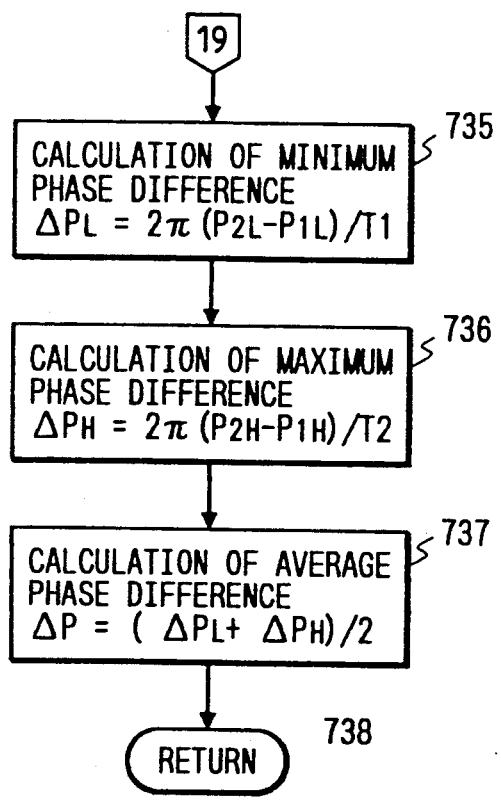

The method of calculation of phase difference between outputs from upstream and downstream $O_2$ sensors is as follows. FIGS. 23, 24, 25 constitute a flow chart of a routine that is executed to detect the phase difference. This routine is executed at successive 4 ms intervals. The routine resembles the routine of the first embodiment, shown in FIGS. 14, 15, which is used for $O_2$ sensor output amplitude and period measurement. However in the case of the third embodiment, the time points at which the minimum and maximum values of the output signal from the downstream $O_2$ sensor 18 are obtained are stored in memory, and the phase difference between the outputs from the $O_2$ sensors 16 and 18 is calculated based on the times at which both of these output signals attain maximum and minimum values.

In the flow chart of FIGS. 23, 24, 25 the steps are numbered from 700. However the tens and units digits of each step number are identical to those of the corresponding step number in the flow chart of FIGS. 14, 15. Only the points of difference between this routine and that of FIGS. 14, 15 will be described in detail in the following.

In steps 701 to 717, the time points $P_{1L}$ and $P_{1H}$ at which the output signal from the upstream $O_2$ sensor 16 reaches minimum and maximum values respectively are obtained, and the period T1 of the output signal from the $O_2$ sensor 16 is calculated. In steps 718 to 734, the time points $P_{2L}$ and $P_{2H}$ at which the output signal from the downstream $O_2$ sensor 18 reaches minimum and maximum values respectively are obtained, and the period T2 of the output signal from the $O_2$ sensor 18 is calculated.

At the same time point when a "yes" decision is reached in step 703, as described for the routine of FIGS. 14, 15, this indicates that the output signal from the upstream $O_2$ sensor 16 changes from a decreasing to an increasing condition, i.e. this is a time point at which that output signal has reached minimum value. Thus, in step 706, a time point $T_{1L}$ corresponding to a minimum value is detected. Similarly, at a time point when a "yes" decision is reached in step 709, as described for the routine of FIGS. 14, 15, this indicates that the output signal from the upstream $O_2$ sensor 16 changes from the increasing to the decreasing condition, i.e. this time point corresponds to a maximum value of the output signal. Thus in step 712, a time point $T_{1H}$, corresponding to a maximum value, is detected.

Detection of the time points at which the output signal from the downstream $O_2$ sensor 18 reaches minimum and maximum values respectively is executed in the same way.

Specifically, if a "yes" decision is reached in step 720, then as described for the routine of FIGS. 14, 15, that is a time point at which the output signal from the downstream $O_2$ sensor 18 changes from the decreasing to the increasing condition, i.e. corresponds to a minimum value of that output signal. Thus in step 723, a time point $T_{2L}$, corresponding to a minimum value, is detected.

Similarly, at a time point when a "yes" decision is reached in step 726, as described for the routine of FIGS. 14, 15, this indicates that the output signal from the downstream $O_2$ sensor 18 changes from the increasing to the decreasing condition, i.e. this time point corresponds to a maximum value of that output signal. Thus in step 729, a time point $R_{2H}$, corresponding to a maximum value, is detected.

Next, operation advances to step 735 of FIG. 25, in which the phase difference between the minimum value time points of the outputs from the $O_2$ sensors 16 and 18 is calculated, i.e. the minimum value phase difference $\Delta P_L$ is calculated, using the following equation:

$$\Delta P_L = 2\pi(P_{2L} - P_{1L})/T1$$

Next, in step 736, the the phase difference between the maximum value time points of the outputs from the $O_2$ sensors 16 and 18 is calculated, i.e. the maximum value phase difference $\Delta P_H$ is calculated, using the following equation:

$$\Delta P_H = 2\pi(P_{2H} - P_{1H})/T1$$

In the next step, 737, the average value of the minimum phase difference $\Delta P_L$ and the maximum phase difference $\Delta P_H$ is calculated, as the average phase difference $\Delta P$.

Figure 26:
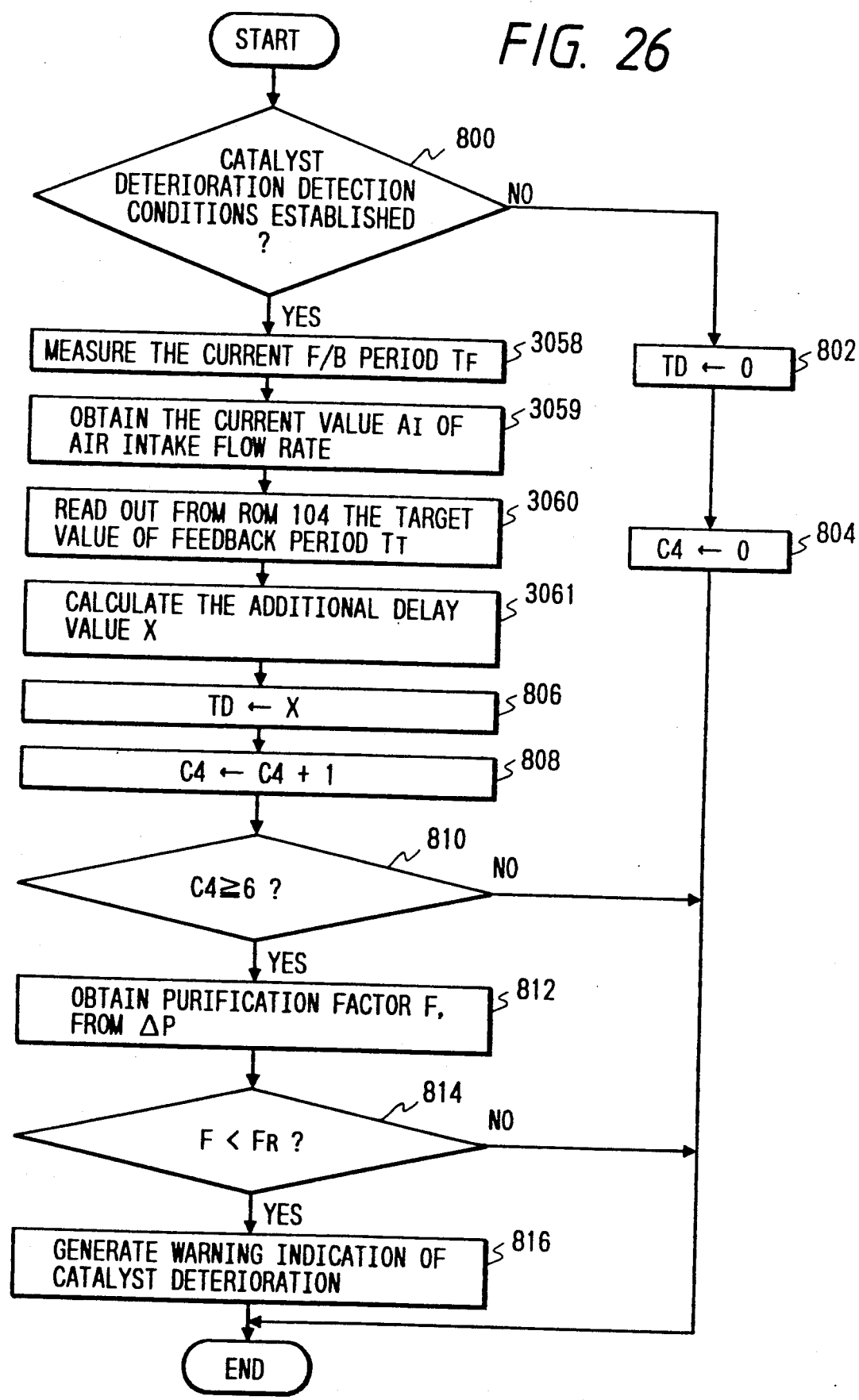
FIG. 26 is a flow chart of a routine which is executed for detecting catalyst deterioration based on values of phase difference detected in the routine of FIGS. 23, 24, 25, according to a third embodiment of the present invention.

Control of catalyst deterioration detection is as follows, with this embodiment. FIG. 26 shows a routine which is executed at periodic 500 ms intervals, for detecting catalyst deterioration, according to the third embodiment of the invention.

In step 800, a decision is made as to whether or not the catalyst deterioration detection conditions are established. In this embodiment, the catalyst deterioration detection conditions are the same as for the first embodiment.

If it is found in step 800 that the catalyst deterioration detection conditions are not satisfied, then step 802 is executed, in which the delay operational quantity TD is set to 0, then in step 804 the counter C4 is cleared to "0", and the failure detection flag FVA is also cleared to "0". After the feedback period has been changed, judgement of catalyst failure is executed following a predetermined time interval. The counter C4 performs counting for determining when that predetermined time interval has elapsed. If it is found in step 800 that the conditions for catalyst deterioration detection are established, then ins step 2058, the current value of air flow rate is obtained, and an appropriate value of target feedback period $T_T$ is read out from RAM 104, as in steps 2058, 2059 of the routine of FIG. 18 described hereinabove. The succeeding steps 3060, 3061 and 3062 are respectively identical to the steps 2060, 2061 and 2062 of the routine of FIG. 18, so that detailed description will be omitted. As for the routine of FIG. 18, a value X is obtained in step 2061, to which the delay operational quantity TD must be set in order to bring the feedback period to the target period $T_T$, and TD is set to the value X in step 3062. As a result, during air-fuel ratio feedback control that is executed following that setting operation, the the rich delay interval −TDR1 and lean delay interval TDL1 (by which the output signal from the downstream O₂ sensor 18 is delayed, as shown in diagram (c) of FIG. 9) are each made longer by that amount TD. Hence, since the airfuel ratio feedback control that is executed after the delay operational quantity TD has been set to the value X is based upon the delayed output signal from the upstream O₂ sensor 16, the feedback period will be brought to the target value $T_T$ during the catalyst deterioration detection operation, in the same way as for the first embodiment described above.

Next, in step 808, the counter c4 is incremented by one, then in step 810 a decision is made as to whether or not the count value of the counter C4 is greater than 6. If C4>6, i.e. if 3 seconds have elapsed since the air-fuel ratio feedback period was changed by being increased, then in step 812 the purification factor F of the catalyst is obtained, based on the average phase difference $\Delta P$ which has been calculated in the routine of FIGS. 23, 24, 25 as described above. The relationship between respective values for the the phase difference $\Delta P$ and the purification factor F is stored in the ROM 104, in the form of a memory map, so that in step 812 the purification factor value corresponding to the phase difference $\Delta P$ is read out from ROM 104. Next, is step 814, a decision is made as to whether or not the purification factor F is greater than a reference value of purification factor $F_R$. If F is greater than $F_R$, then the routine execution is terminated. However if F is found to be smaller than $F_R$, then in step 816, a command is sent to the alarm 19 to produce a warning indication that failure of the catalytic converter 15 has occurred.

The relationship between the purification factor F and the phase difference between output signals from the upstream O₂ sensor 16 and the downstream O₂ sensor 18 is shown in FIG. 27, with feedback period as a parameter. As shown, when the feedback period is short, it becomes impossible to judge the purification factor on the basis of the phase difference over a sufficiently wide range of values of purification factor. On the other hand, if the feedback period is made sufficiently long, the phase difference $\Delta P$ varies in accordance with changes in the purification factor F over a sufficiently wide range, so that in that case the purification factor X can be accurately measured based on the phase difference $\Delta P$.

Even for the same type of catalytic converter 15, the phase difference $\Delta P$ contains components (i.e. representing the response characteristic of that particular catalytic converter) which depend upon the specific constituents of that converter. Hence, it may be preferable to measure the purification factor based on a relationship between values of purification factor of the catalyst and amounts of deviation between values of phase difference $\Delta P$ that have been obtained under two different operating conditions of the engine.

Figure 28:
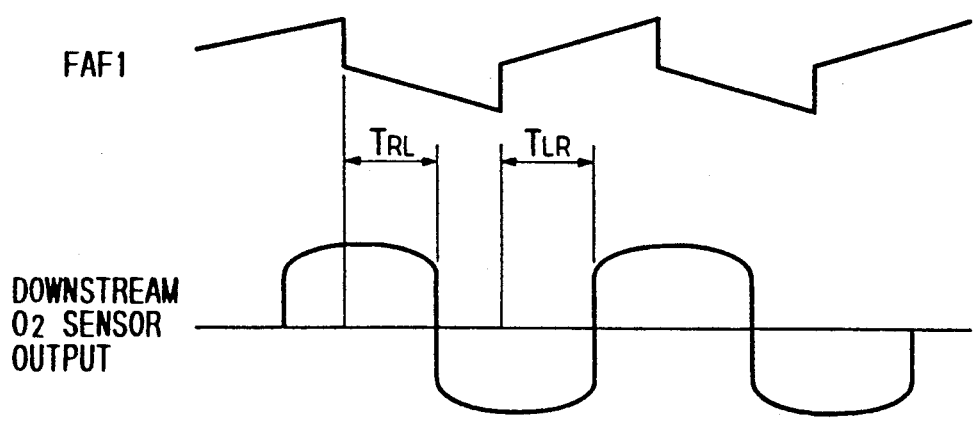
FIG. 28 is a timing diagram for illustrating a second method of obtaining measured values of phase difference, for use in detecting the catalyst purification factor.

Another embodiment of the invention will now be described. This is a modification of the third embodiment described above, so that detailed description will be omitted. This embodiment differs from the third embodiment only in that the phase difference $\Delta P$ is obtained as a time difference between a transition of said output signal from the first O₂ sensor between conditions indicating a rich air-fuel ratio and a lean air-fuel ratio respectively, and a corresponding transition of said output signal from the second O₂ sensor. These time differences are illustrated in FIG. 28. Here, $T_{RL}$ designates a time difference between a point at which the F/B correction coefficient changes from a condition for producing an increased value of the fuel injection quantity to a condition for producing a decreased fuel injection quantity and a succeeding point at which the output signal from the downstream O₂ sensor changes from the rich to the lean indication condition. Similarly, $T_{LR}$ designates a time difference between a point at which the F/B correction coefficient changes from a condition for producing a decreased value of the fuel injection quantity to a condition for producing an increased fuel injection quantity and a succeeding point at which the output signal from the downstream O₂ sensor changes from the lean to the rich indication condition. Thus with this modification of the third embodiment, the phase difference $\Delta P$ can be obtained by measuring either of these time differences $T_{LR}$ or $T_{RL}$.

However since in general these values of time difference will not be mutually identical, a more accurate values of phase difference can be obtained by calculating $\Delta P$ as the average value of $T_{LR}$ and $T_{RL}$, i.e. as :

$$\Delta P = (T_{RL} + T_{LR})/2$$

With each of the embodiments of the invention described above, the feedback period during detection of catalyst deterioration is altered by changing the rich and lean delay intervals −TDR1, TDL1 by which the output signal from the upstream O₂ sensor 16 is delayed to thereby obtain the delayed air-fuel ratio signal A/F1' as shown in FIG. 9. However it would be equally possible to use a method whereby the skip quantity RS1 which is applied to the feedback correction coefficient is altered (i.e. the quantity which determines the magnitude of step changes in the F/B correction coefficient, from the lean to the rich condition or from the rich to the lean condition, as shown in FIG. 9) Alternatively, it would be possible to change the integration constant KI1, to change the feedback period.

Moreover, with each of the embodiments described above, the feedback period during detection of catalyst deterioration is made longer than the feedback period during normal air-fuel ratio control. However, depending upon the particular method of measurement used, it may be necessary to shorten the feedback period during detection of catalyst deterioration, by comparison with the period which occurs during normal air-fuel ratio operation.

It should also be noted that it would be possible to use other methods of catalyst purification factor measurement, and that various other modifications to the described embodiments may be envisaged, which fall within the scope claimed for the invention.

What is claimed is:

1. A catalyst purification factor detection apparatus for an internal combustion engine arrangement having a catalytic converter containing a catalyst disposed in an exhaust system thereof, and first and second oxygen sensors respectively disposed upstream and downstream from said catalyst, said first and second oxygen sensors producing respective output signals, each signal selectively indicating rich and lean airfuel ratio conditions, said catalyst purification factor detection apparatus comprising:

feedback correction means responsive to at least said output signal from said first oxygen sensor for obtaining successive values of a feedback correction coefficient which is applied to control a fuel injection quantity of said internal combustion engine, said successive values changing periodically, with a feedback period, between a condition for producing an increase in said fuel injection quantity and a condition for producing a reduction of said fuel injection quantity;

feedback correction coefficient control means for judging whether said engine is operating in a condition which satisfies predetermined catalyst deterioration detection conditions, and functioning during an operation for judging a purification factor of said catalyst, for changing said feedback period to a different value from a feedback period which occurs during a normal air-fuel ratio control condition, and for holding said feedback period fixed at said different value during said operation for judging the purification factor, so long as it is judged that said predetermined catalyst deterioration detection conditions continue to be satisfied; and detection means for judging said purification factor, based at least on said output signal from said second oxygen sensor, while said feedback period is fixed at said different value.

2. In an internal combustion engine having a catalytic converter containing a catalyst disposed in an exhaust system of the engine, and first and second oxygen sensors respectively disposed upstream and downstream from said catalyst within said exhaust system, said first and second oxygen sensors producing respective output signals, each signal selectively indicating rich and lean air-fuel ratio conditions, a catalyst purification factor detection apparatus comprising:

feedback correction means responsive to at least said output signal from said first oxygen sensor for obtaining successive values of a feedback correction coefficient which is applied to control a fuel injection quantity of said internal combustion engine, said successive values changing periodically, with a feedback period, between a condition for producing an increase in said fuel injection quantity and a condition for producing a reduction of said fuel injection quantity;

feedback correction coefficient control means functioning during an operation for judging a purification factor of said catalyst, for changing said feedback period to a different value from a feedback period which occurs during a normal air-fuel ratio control condition;

detection means for judging said purification factor, based at least on said output signal from said second oxygen sensor; and means for deriving from said output signal from said first oxygen sensor a corresponding first air-fuel ratio signal which goes to first and second fixed levels in accordance with a rich and lean air-fuel ratio respectively, and means for deriving from said first air-fuel ratio signal a second air-fuel ratio signal wherein each transition between said first and second levels is delayed by a specific amount with respect to a corresponding transition of said first air-fuel ratio signal, with a period of alternation of said second air-fuel ratio signal defining said feedback period.

3. A purification factor detection apparatus according to claim 2, comprising means for changing said amount of delay by a delay operational quantity (TD), for thereby implementing said changing of said feedback period to a different value during an operation of purification factor judgement.

4. A purification factor detection apparatus according to claim 3, wherein said feedback period is changed to a predetermined target value, and wherein said feedback correction coefficient control means comprises means for deriving a requisite value for said delay operational quantity, including means for measuring a current value of said feedback period, means for calculating a frequency difference between said current value and said target value of feedback period, and means for deriving said value of additional amount of delay based on said frequency difference and a predetermined relationship between values of said feedback period and amounts of delay applied to said first air-fuel ratio signal for obtaining said second air-fuel ratio signal.

5. A purification factor detection apparatus according to claim 4, wherein said target value of feedback period is selected to be longer than a value of feedback period which occurs during a normal emission control operating condition of said engine, and to be within a range of values of feedback period which do not result in a lowering of emission control quality.

6. A purification factor detection apparatus according to claim 4, wherein said target value is determined based on a current rate of flow of intake air to said engine.

7. In an internal combustion engine having a catalytic converter containing a catalyst disposed in an exhaust system of the engine, and first and second oxygen sensors respectively disposed upstream and downstream from said catalyst within said exhaust system, said first and second oxygen sensors producing respective output signals, each signal selectively indicating rich and lean air-fuel ratio conditions, a catalyst purification factor detection apparatus comprising:

Feedback correction means responsive to at least said output signal from said first oxygen sensor for obtaining successive values of a feedback correction coefficient which is applied to control a fuel injection quantity of said internal combustion engine, said successive values changing periodically, with a feedback period, between a condition for producing an increase in said fuel injection quantity and a condition for producing a reduction of said fuel injection quantity;

feedback correction coefficient control means functioning during an operation for judging a purification factor of said catalyst, for changing said feedback period to a different value from a feedback period which occurs during a normal air-fuel ratio control condition, wherein said feedback correction coefficient control means functions to increase said feedback period to a predetermined target value during said operation for purification factor judgement, and wherein said detection means functions to detect whether an amplitude variation of said output signal from said second oxygen sensor reaches a predetermined threshold value, after said predetermined target value of feedback period has been reached; and detection means for judging said purification factor.

8. In an internal combustion engine having a catalytic converter containing a catalyst disposed in an exhaust system of the engine, and first and second oxygen sensors respectively disposed upstream and downstream from said catalyst within said exhaust system, said first and second oxygen sensors producing respective output signals, each signal selectively indicating rich and lean air-fuel ratio conditions, a catalyst purification factor detection apparatus comprising:

feedback correction means responsive to at least said output signal from said first oxygen sensor for obtaining successive values of a feedback correction coefficient which is applied to control a fuel injection quantity of said internal combustion engine, said successive values changing periodically, with a feedback period, between a condition for producing an increase in said fuel injection quantity and a condition for producing a reduction of said fuel injection quantity;

feedback correction coefficient control means functioning during an operation for judging a purification factor of said catalyst, for changing said feedback period to a different value from a feedback period which occurs during a normal air-fuel ratio control condition, wherein said feedback correction coefficient control means functions to increase said feedback period by successive specific small amounts during said operation for purification factor judgement, and wherein said detection means functions to detect a value of said feedback period, reached at a point during said increasing of the feedback period by successive small amounts, at which a variation amplitude of said output signal from said second oxygen sensor reaches a predetermined threshold value; and detection means for judging said purification factor.

9. A catalyst purification factor detecting apparatus for an internal combustion engine arrangement having a catalytic converter containing a catalyst disposed in an exhaust system of the engine, and first and second oxygen sensors respectively disposed upstream and downstream from said catalyst within said exhaust system, said first and second oxygen sensors producing respective output signals, each signal selectively indicating rich and lean air-fuel ratio conditions, said catalyst purification factor detection apparatus comprising:

feedback correction means responsive to at least said output signal from said first oxygen sensor for obtaining successive values of a feedback correction coefficient which is applied to control a fuel injection quantity of said internal combustion engine, said successive values changing periodically, with a feedback period, between a condition for producing an increase in said fuel injection quantity and a condition for producing a reduction of said fuel injection quantity;

feedback correction coefficient control means functioning during an operation for judging a purification factor of said catalyst, for changing said feedback period to a different value from a feedback period which occurs during a normal air-fuel ratio control condition, wherein said feedback correction coefficient control means functions to increase said feedback period to a predetermined target value of feedback period during said operation for purification factor judgement; and detection means for judging said purification factor, wherein said detection means functions to measure a value of phase difference between said output signals from the first and second oxygen sensors, and to obtain a value of purification factor of said catalyst from said phase difference value, based upon a predetermined relationship between respective values of said phase difference and purification factor at said target value of feedback period.

10. A purification factor detection apparatus according to claim 9, wherein said phase difference value is measured by said detection means as a time difference between a transition between conditions of said output signal from the first oxygen sensor indicating a rich air-fuel ratio and a lean air-fuel ratio respectively, and a corresponding transition of said output signal from the second oxygen sensor.

11. A purification factor detection apparatus according to claim 10, wherein said phase difference value is measured as an average value of time interval $(T_{RL}+T_{LR})/2$, where $T_{RL}$ is a time difference between a point at which said feedback correction coefficient changes from a condition for producing an increased value of said fuel injection quantity to a condition for producing a decreased value of said fuel injection quantity to a point at which said output signal from the second oxygen sensor changes from a condition indicating a rich air-fuel ratio to a condition indicating a lean air-fuel ratio, and $T_{LR}$ is a time difference between a point at which said feedback correction coefficient changes from a condition for producing a decreased value of said fuel injection quantity to a condition for producing an increased value of said fuel injection quantity and a point at which said output signal from the second oxygen sensor changes from a condition indicating a lean air-fuel ratio to a condition indicating a rich air-fuel ratio.

12. A catalyst purification factor detection apparatus for an internal combustion engine, comprising:

a catalytic converter (15) containing a catalyst, disposed in an exhaust system of said internal combustion engine, said first and second oxygen sensors (16, 18) respectively disposed upstream and downstream from said catalyst within said exhaust system, said first and second oxygen sensors producing respective output signals, each signal selectively indicating rich and lean air-fuel ratio conditions;

feedback correction means responsive to at least said output signal from said first oxygen sensor for obtaining successive values of a feedback correction coefficient which is applied to control a fuel injection quantity of said internal combustion engine, transitions of said values occurring periodically, with a feedback period, between a condition for producing an increase in said fuel injection quantity and a condition for producing a reduction of said fuel injection quantity, said correction means including means for delaying said transitions by a specific amount with respect to corresponding transitions of said output signal from the first oxygen sensor between said rich and lean indication conditions;

feedback correction coefficient control means functioning during an operation for judging a purification factor of said catalyst, for changing said feedback period from a value of feedback period which occurs during a normal emission control condition to a target feedback period ($T_T$), by changing said delay amount by a delay operational quantity (TD); and detection means for judging said purification factor, based at least on said output signal from said second oxygen sensor.

13. A catalyst purification factor detection apparatus according to claim 12, wherein said correction means includes means for measuring a current value of said feedback period, means for computing an amount of difference between said target feedback period and said current feedback period, and means for obtaining an appropriate value for said delay operational quantity (TD) based on said difference and upon a known relationship between values of delay applied to said transitions of the output signal from the first oxygen sensor and corresponding values of feedback period.

14. In an internal combustion engine having a catalytic converter containing a catalyst disposed in an exhaust system of the engine, and first and second oxygen sensors respectively disposed upstream and downstream from said catalyst within said exhaust system, said first and second oxygen sensors producing respective output signals, each signal selectively indicating rich and lean air-fuel ratio conditions, a catalyst purification factor detection apparatus comprising:

feedback correction means responsive to at least said output signal from said first oxygen sensor for obtaining successive values of a feedback correction coefficient which is applied to control a fuel injection quantity of said internal combustion engine, said successive values changing periodically, with a feedback period, between a condition for producing an increase in said fuel injection quantity and a condition for producing a reduction of said fuel injection quantity;

feedback correction coefficient control means functioning during an operation for judging a purification factor of said catalyst, for changing said feedback period to a different value from a feedback period which occurs during a normal air-fuel ratio control condition, wherein said feedback correction means includes means for executing each of said periodic changes of said feedback correction coefficient as a stepwise change in accordance with a predetermined fixed skip quantity; and detection means for judging said purification factor, based at least on said output signal from said second oxygen sensor.

15. A catalyst purification factor detection apparatus for an internal combustion engine, comprising:

a catalytic converter (15) containing a catalyst, disposed in an exhaust system of said internal combustion engine, and first and second oxygen sensors (16, 18) respectively disposed upstream and downstream from said catalyst within said exhaust system, said first and second oxygen sensors producing respective output signals, each signal selectively indicating rich and lean air-fuel ratio conditions;

feedback correction means responsive to at least said output signal from said first oxygen sensor for obtaining successive values of a feedback correction coefficient which is applied to control a fuel injection quantity of said internal combustion engine, transitions of said values occurring periodically, with a feedback period, between a condition for producing an increase in said fuel injection quantity and a condition for producing a reduction of said fuel injection quantity, said correction means including means for delaying said transitions by a specific amount with respect to corresponding transitions of said output signal from the first oxygen sensor between said rich and lean indication conditions;

feedback correction coefficient control means functioning during an operation for judging a purification factor of said catalyst, for increasing said feedback period from a value of feedback period which occurs during a normal emission control condition to a target feedback period ($T_T$), by changing said delay amount by a predetermined delay operational quantity (TD) that is determined based on a difference between said target feedback period and a current value of feedback period; and detection means for measuring a value of phase difference between said output signal from the first and second oxygen sensors, for obtaining a value of purification factor of said catalyst from said phase difference value, based upon a predetermined relationship between respective values of said phase difference and purification factor at said target value of feedback period, and for comparing said obtained value of purification factor with a reference value of purification factor.

16. In an internal combustion engine having a catalytic converter containing a catalyst disposed in an exhaust system of the engine, a first oxygen sensor and a second oxygen sensor disposed in said exhaust system respectively upstream and downstream from said catalyst, and means for executing negative feedback control of an air-fuel ratio of said engine based upon at least an output signal produced from said first oxygen sensor by deriving successive values of a feedback correction coefficient which is applied to control a fuel injection quantity of said engine, said values varying periodically with a feedback period between a condition for increasing said fuel injection quantity and a condition for decreasing said fuel injection quantity, a method of detecting a purification factor of said catalyst, comprising steps of:

judging whether said engine is operating in a condition which satisfies predetermined catalyst deterioration detection conditions;

changing said feedback period to a value that is different from a feedback period which occurs during a normal air-fuel ratio control mode of operation, and holding said feedback period fixed at said different value during said operation for judging the purification factor, so long as said predetermined catalyst deterioration conditions continue to be satisfied; and detecting said purification factor, on the basis of a condition of at least an output signal produced from said second oxygen sensor, while said feedback period is fixed at said different value.

17. In an internal combustion engine having a catalytic converter containing a catalyst disposed in an exhaust system of the engine, a first oxygen sensor and a second oxygen sensor disposed in said exhaust system respectively upstream and downstream from said catalyst, and means for executing negative feedback control of an air-fuel ratio of said engine based upon at least an output signal produced from said first oxygen sensor by deriving successive values of a feedback correction coefficient which is applied to control a fuel injection quantity of said engine, said values varying periodically with a feedback period between a condition for increasing said fuel injection quantity and a condition for decreasing said fuel injection quantity, a method of detecting a purification factor of said catalyst, comprising steps of:

changing said feedback period to a value that is different from a feedback period which occurs during a normal air-fuel ration control mode of operation wherein said values of the feedback correction coefficient are determined at time points which are delayed by a specific amount with respect to corresponding transitions of the feedback correction coefficient are determined at time points which are delayed by a specific amount with respect to corresponding transitions of said output signal from the first oxygen sensor between a first condition that indicates a rich air-fuel ration and a second conditions that indicates a lean air-fuel ratio, and in which said step of changing the feedback period is executed by changing said delay amount by a specific delay operational quantity.

18. A purification factor detection method according to claim 17, in which said change in the delay amount consists of a single step change, for setting the feedback period to a target value.

19. A purification factor detection method according to claim 18, in which said step of detecting the purification factor is implemented by comparing a value of output signal amplitude from said second oxygen sensor with a predetermined threshold value, after said feedback period has been changed to said target value.

20. A purification factor detection method according to claim 18, in which said step of detecting the purification factor is implemented, after said feedback period has been changed to said target value, by:

measuring an amount of phase difference between said output signals from the first and second oxygen sensors;

obtaining a value of purification factor of said catalyst from said phase difference value, based upon said phase difference and a predetermined relationship between respective values of said phase difference and purification factor at said target value of feedback period; and comparing said obtained value of purification factor with a reference value of purification factor.

21. A purification factor detection method according to claim 20, in which said step of measuring an amount of phase difference is implemented by measuring a time difference between a transition of said output signal from the first oxygen sensor, between conditions indicating a rich air-fuel ratio and a lean air-fuel ratio respectively, and a corresponding transition of said output signal from the second oxygen sensor.

22. A purification factor detection method according to claim 20, in which said step of measuring an amount of phase difference is implemented by measuring an average value of time interval $(T_{RL}+T_{LR})/2$, where $T_{RL}$ is a time difference between a point at which said feedback correction coefficient changes from a condition for producing an increased value of said fuel injection quantity to a condition for producing a decreased value of said fuel injection quantity to a point at which said output signal from the second oxygen sensor changes from a condition indicating a rich air-fuel ratio to a condition indicating a lean air-fuel ratio, and $T_{LR}$ is a time difference between a point at which said feedback correction coefficient changes from a condition for producing a decreased value of said fuel injection quantity to a condition for producing an increased value of said fuel injection quantity and a point at which said output signal from the second oxygen sensor changes from a condition indicating a lean air-fuel ratio to a condition indicating a rich air-fuel ratio.

23. A purification factor detection method according to claim 18, in which the value of said delay operational quantity (TD), for achieving said target value, is established by steps of:

during normal air-fuel ratio control operation, measuring a current value of said feedback period;

calculating an amount of difference between said target value and said current value of feedback period;

obtaining an appropriate value for said delay operational quantity (TD) based on said difference and upon a known relationship between values of delay applied to said transitions of the output signal from the first oxygen sensor and corresponding values of feedback period.

24. A purification factor detection method according to claim 18, in which said target value is selected to be within a range of values of feedback period for which no substantial deterioration of a quality of emission control by said catalyst will occur.

25. A purification factor detection method according to claim 18, in which said target value is determined in accordance with an intake air flow rate of said engine.

26. A purification factor detection method according to claim 17, in which said change in the delay amount consists of successive small step increments, which are executed until said output signal from the second oxygen sensor reaches a predetermined threshold value of amplitude.

* * * * *